(12) United States Patent
Evans et al.

(10) Patent No.: US 8,444,941 B2
(45) Date of Patent: May 21, 2013

(54) CRACKING CATALYSTS, ADDITIVES, METHODS OF MAKING THEM AND USING THEM

(75) Inventors: Martin Evans, Tolland, CT (US); Raymond Fletcher, Houston, TX (US); Mehdi Allahverdi, Pooler, GA (US); Guido Aru, Conifer, CO (US); Paul Diddams, Prague (CZ); Xunhua Mo, Savannah, GA (US); William Reagan, Montgomery, IL (US); Shanthakumar Sithambaram, Pooler, GA (US)

(73) Assignee: Intercat Equipment, Inc., Manasquan, NJ (US)

( * ) Notice: Subject to any disclaimer, the term of this patent is extended or adjusted under 35 U.S.C. 154(b) by 62 days.

(21) Appl. No.: 13/115,955

(22) Filed: May 25, 2011

(65) Prior Publication Data
US 2011/0308620 A1    Dec. 22, 2011

Related U.S. Application Data

(60) Provisional application No. 61/396,255, filed on May 25, 2010, provisional application No. 61/428,654, filed on Dec. 30, 2010, provisional application No. 61/437,866, filed on Jan. 31, 2011.

(51) Int. Cl.
*B03C 3/00* (2006.01)
*B03C 3/013* (2006.01)
*B01D 53/34* (2006.01)

(52) U.S. Cl.
USPC ............ 423/210; 95/58; 95/61; 95/62

(58) Field of Classification Search
USPC ..................... 423/210; 95/58, 61, 62
See application file for complete search history.

(56) References Cited

U.S. PATENT DOCUMENTS

| 4,469,588 | A | | 9/1984 | Hettinger, Jr. et al. |
| 4,918,036 | A | | 4/1990 | Rheaume et al. |
| 5,585,081 | A | | 12/1996 | Chu et al. |
| 5,990,030 | A | | 11/1999 | McCauley |
| 6,001,152 | A | * | 12/1999 | Sinha ........................ 95/58 |

(Continued)

FOREIGN PATENT DOCUMENTS

| JP | 08327015 A | 12/1996 |
| JP | 2008023428 A | 2/2008 |

OTHER PUBLICATIONS

PCT international search report and written opinion of PCT/US2011/038005 dated Feb. 17, 2012.

*Primary Examiner* — Timothy Vanoy
(74) *Attorney, Agent, or Firm* — Kevin M. Carroll

(57) ABSTRACT

Collection enhanced materials, flue gas additives, and methods of making the enhanced materials and flue gas additives are provided. In one embodiment, a down stream addition system configured to control material passing through a metering device from a vessel to a gaseous exhaust path extending between a unit and an exhaust flue of the unit is provided. In alternative embodiments, methods are provided for introducing at least one of a flue gas additive and a collection enhanced material to a gaseous exhaust stream exiting a unit; exposing and removing at least a portion of at least one a of flue gas additive and a collection enhanced material from a gaseous exhaust stream exiting a unit prior to entering an exhaust flue; and recycling at least a portion of material removed a from a gaseous exhaust stream exiting a unit back to the gaseous exhaust stream without passing through the unit.

11 Claims, 24 Drawing Sheets

U.S. PATENT DOCUMENTS

| | | |
|---|---|---|
| 6,165,429 A | 12/2000 | Ikeda et al. |
| 6,797,035 B2 * | 9/2004 | Baldrey et al. .................... 95/58 |
| 7,300,496 B2 * | 11/2007 | Taylor ................................ 95/58 |
| 2003/0077212 A1 | 4/2003 | Hammer |
| 2005/0103684 A1 | 5/2005 | Evans |
| 2007/0251862 A1 | 11/2007 | Evans et al. |
| 2009/0078177 A1 | 3/2009 | Wu et al. |
| 2009/0163354 A1 | 6/2009 | Andy et al. |
| 2010/0071348 A1 | 3/2010 | Kobayashi et al. |

* cited by examiner

US 8,444,941 B2

CRACKING CATALYSTS, ADDITIVES, METHODS OF MAKING THEM AND USING THEM

CROSS REFERENCE TO RELATED APPLICATIONS

This application claims benefit of U.S. Provisional Patent Application Ser. No. 61/396,255, filed May 25, 2010, U.S. Provisional Patent Application Ser. No. 61/428,654, filed Dec. 30, 2010, and U.S. Provisional Patent Application Ser. No. 61/437,866, filed Jan. 31, 2011, which are incorporated by reference in their entireties.

BACKGROUND OF THE INVENTION

1. Field of the Invention

Embodiments of the invention generally relate to one or more collection enhanced materials, flue gas additives, methods of making such, apparatuses for adding such when used with one or more units, and methods of using such in one or more units, such as fluidized units.

2. Description of the Related Art

FIG. 1 is a schematic diagram of a conventional fluid catalytic cracking system 130. The fluid catalytic cracking system 130 generally includes a fluid catalytic cracking (FCC) unit 100 coupled to a catalyst addition system 110, a petroleum feed stock source 104, an exhaust gas system 114, and a distillation system 116.

The FCC unit 100 includes a regenerator 150 and a reactor 152. The reactor 152 primarily houses the catalytic cracking reaction of the petroleum feed stock and delivers the cracked product in vapor form to the distillation system 116. Spent catalyst from the cracking reaction is transferred from the reactor 152 to the regenerator 150 to regenerate the catalyst by removing coke and other materials. The regenerated catalyst is then reintroduced into the reactor 152 to continue the petroleum cracking process. Exhaust gas from the regenerator 150 exits the FCC unit 100 through an exhaust path 108, traveling through the exhaust system 114 until exiting the exhaust system 114 to the environment through an exhaust flue 106.

The catalyst addition system 110 maintains a continuous or semi continuous addition of fresh base catalyst to the inventory circulating between a regenerator and a reactor. The catalyst addition system 110 generally includes a vessel 112 coupled to the FCC unit 100 by a feed line 118. An additive addition system 120 may also be utilized to maintain a continuous or semi continuous addition of fresh additives to the FCC unit 100, for example, for emission control. The additive addition system 120 is typically disposed near the catalyst addition system 110 and generally includes a vessel 122 coupled to the FCC unit 100 by the feed line 118.

During the catalytic cracking process, there is a dynamic balance of the total amount of the base cracking catalyst within the FCC unit and desire to maintain the activity level of the base cracking catalyst within the FCC unit. The amount of base cracking catalyst within the FCC unit may increase over time, which may result in the catalyst bed level within the regenerator reaching an upper operating limit. The catalyst bed level may reach an upper operating limit when the catalyst addition rate for maintenance of catalyst activity or level exceeds the lost catalyst and the excess catalyst is periodically withdrawn from the FCC unit. Conversely, the amount of base catalyst within the FCC unit may decrease significantly over time, causing the performance and desired output of the FCC unit to diminish, and in extreme cases the FCC unit may become inoperable. For example, fresh base cracking catalyst is periodically added to the FCC unit to replace base catalyst lost in various ways or to replenish base catalyst which has become deactivated over time. Catalyst and additives become fines (also called particulate matter and hereinafter referred to as "PM") by attrition during gradual transfer to and from the reactor 152 and regenerator 150. Fines transfer more easily out of the FCC unit with the waste or product streams. Fines exiting the regenerator through the exhaust flue may be considered an environmental hazard. As such, one or more particle removal devices are typically utilized to prevent fines from exiting the exhaust flue. These particle removal devices may include third stage separators (TSS) and electrostatic precipitators (ESP). In many refineries, the ESP is the final device used to reduce the level of PM emitted to atmosphere from the FCC flue gas stream by absorbing PM.

To improve ESP collection of PM, a refiner generally increases the power to the ESP, and/or injects ammonia into or upstream of the ESP. Increased power usage is expensive and increases $CO_2$ emissions Ammonia is effective, but excess ammonia can lead to ammonia emission through the flue stack, which is also under scrutiny as an environmental pollutant. Thus, increasing the efficiency of the ESP with ammonia is not considered a viable long term solution.

Additionally, refineries must also meet Environmental Protection Agency (EPA) $SO_x$ emissions regulations. However, low levels of $SO_x$ emissions in the FCC unit flue gas stream causes an increase in the emission of PM. Thus, as refineries try to reduce $SO_x$ emissions to meet environmental regulations, operating costs increase along with an increase in the amount of PM released to the environment through the flue stack.

Thus, a need exists for a cost effective way to meet EPA $SO_x$ emissions regulations without increasing PM emissions or increasing ammonia usage. A need also exists for collection enhanced materials, flue gas additives, methods of making such, apparatuses for adding such to one or more units, and methods of using such in one or more units, such as fluidized units.

BRIEF DESCRIPTION

Embodiments of the invention generally include collection enhanced materials, flue gas additives, methods of making the enhanced materials and flue gas additives, apparatuses for handling enhanced materials and flue gas additives when used with one or more units, and methods for using the same to improve the operation of units, such as fluidized units, among others.

In one embodiment, a down stream addition system includes a first vessel, a metering device, and a sensor configured to provide a metric indicative of material passing through the metering device. The metering device is coupled to a first outlet of the first vessel and is configured to control material passing through the metering device from the first vessel to a gaseous exhaust path extending between a unit and an exhaust flue of the unit.

In another embodiment, a method includes routing a gaseous exhaust stream from an outlet of a unit to an exhaust flue through an exhaust path, and introducing a material such as a flue gas additive and a collection enhanced material to the gaseous exhaust stream.

In another embodiment, a method includes routing a gaseous exhaust stream through an exhaust path defined between an outlet of a unit and an exhaust flue, exposing a material such as a flue gas additive and a collection enhanced material to the gaseous exhaust stream, and removing at least a portion of the material from the gaseous exhaust stream prior to entering the exhaust flue.

In yet another embodiment, a method includes removing a material from a gaseous exhaust stream exiting a unit, and recycling at least a portion of the removed material back to the gaseous exhaust stream without passing through the unit.

DESCRIPTION OF THE DRAWINGS

The accompanying figures, which are incorporated in and constitute part of this specification, are included to illustrate and provide a further understanding of the different embodiments of the materials, method and system of the invention. Together with the description, the drawings serve to explain the principles of the invention.

Figure 1:
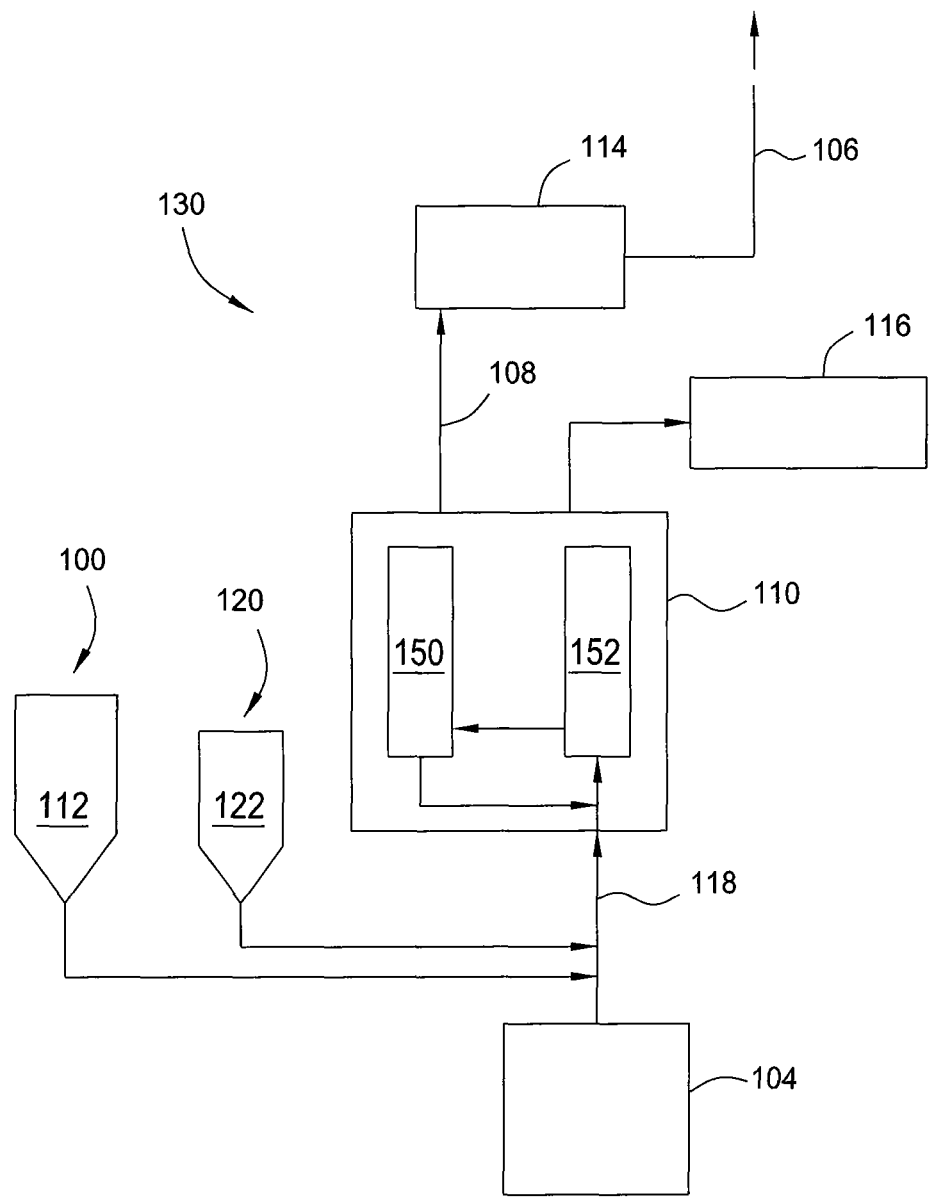
FIG. 1 is a schematic diagram of a conventional fluid catalytic cracking system.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms.

Approximating language, as used herein throughout the specification and claims, may be applied to modify any quantitative or qualitative representation that could permissibly vary without resulting in a change in the basic function to which it is related. Accordingly, a value modified by a term such as "from about" or "to about" is not to be limited to a specified precise value, and may include values that differ from the specified value. In at least some instances, the approximating language may correspond to the precision of an instrument for measuring the value.

Reference will now be made in detail to exemplary embodiments of the invention which are illustrated in the accompanying figures and examples. Referring to the drawings in general, it will be understood that the illustrations are for describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group, including any stable reaction products of any combination of elements of the group. Furthermore, when any variable occurs more than one time in any constituent or in formula, its definition on each occurrence is independent of its definition at every other occurrence. Also, combinations of substituents and/or variables are permissible only if such combinations result in stable compounds.

Figure 2:
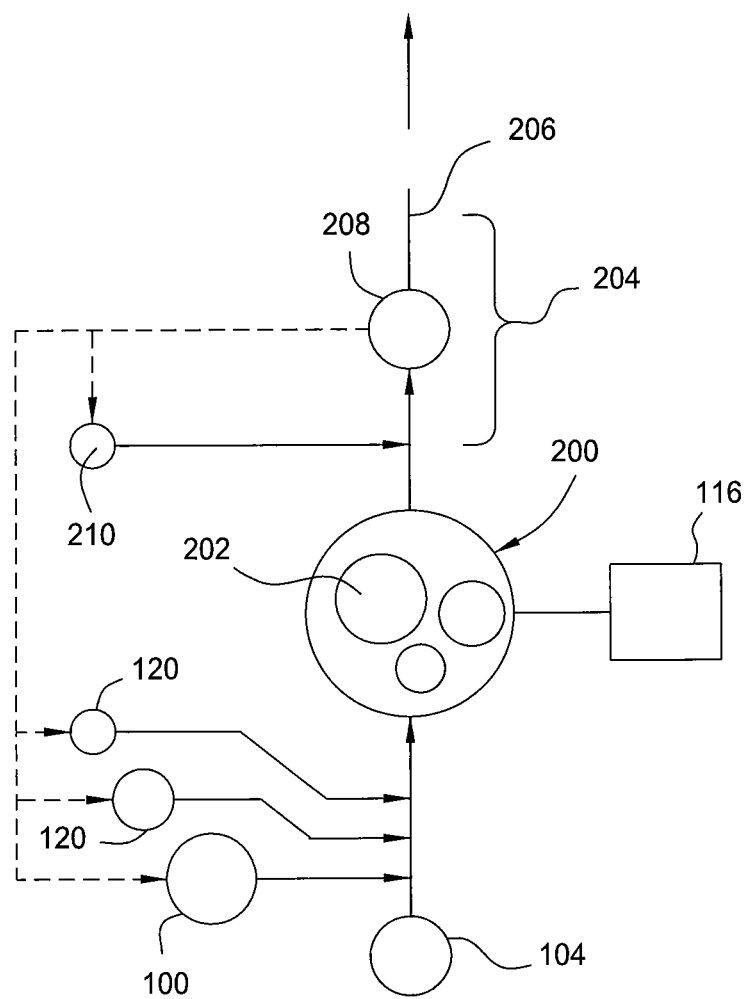
FIG. 2 is a schematic diagram of an exemplary unit illustrating how materials of the present invention interface with a unit in accordance with an embodiment of the invention.

An embodiment of the invention includes materials which enhance the collection of PM in an exhaust stream of a unit and/or reduce emissions in an exhaust stream of a unit. Materials of the present invention are generally grouped according to the interaction of the materials with the unit. FIG. 2 is an exemplary unit illustrating context of various embodiments of the materials of the invention. Once the distinction between different embodiments of the materials has been established, details for each embodiment of the materials of the invention will follow.

FIG. 2 is a schematic diagram of one embodiment of a unit 200 having one or more reaction zones 202 defined in detailed therein. The unit 200 includes an exhaust system 204 through which a gaseous exhaust stream is routed through a flue stack 206 to the environment. The exhaust system 204 includes a particle removal device 208, which may include one or more third stage separators (TSS) and/or ESPs. The particle removal device 208 removes PM, which may at least partially include the materials of the present invention, from the exhaust stream. At least some embodiments of the materials of the present invention are suitable for recycling through the reaction zone 202 of the unit 200 and/or recycling through the exhaust system 204 handling the gaseous exhaust stream exiting the unit 200.

As discussed above, materials of the present invention which enhance the collection of PM in the exhaust stream exiting the unit and/or reduce emissions in the exhaust stream of the unit are grouped according to the interaction of the materials with the unit. A first group of materials of the present invention are hereinafter referred to as collection enhanced materials (CEM), illustrated below in FIG. 3A utilizing reference numeral 300. CEM 300 generally are material having an attribute that makes the collection of CEM by the particle removal device 208 from the exhaust stream exiting the unit 200 through the exhaust system 204 more efficient relative to conventional catalysts and additives. CEM 300 as described herein is a virgin material, meaning that the material has never been exposed to a process for which it has been intended, for example, as a cracking catalyst within an FCC unit. In some embodiments, CEM 300 is recycled after exposure, wherein the term recycled CEM will be utilized to provide distinction from virgin CEM. CEM 300 includes two subgroups, collection enhanced catalysts (CEC) and collection enhanced additives (CEA).

Collection Enhanced Materials (CEM)

Figure 3A:
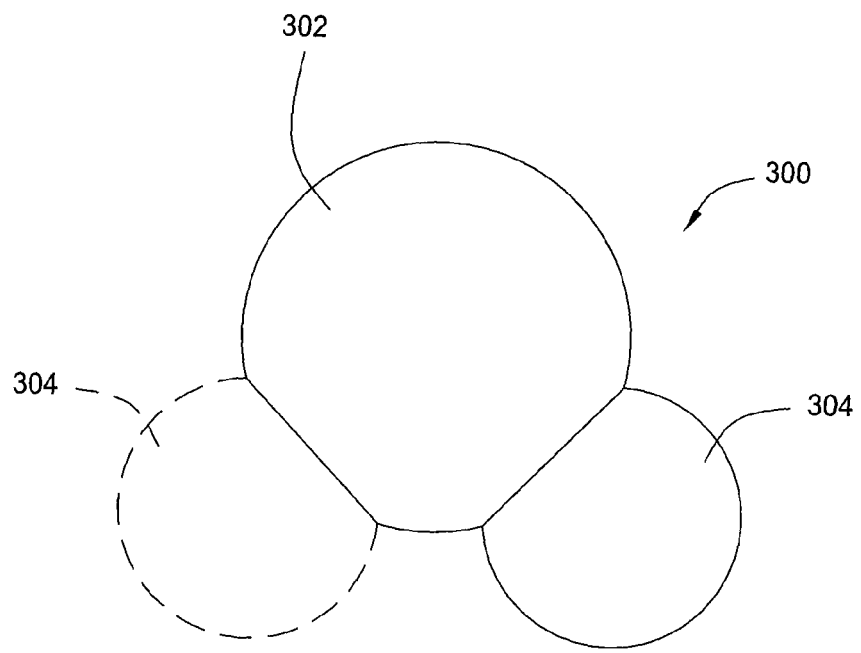
FIG. 3A is a simplified schematic of a collection enhanced material in accordance with an embodiment of the invention.

In an embodiment of the invention illustrated in FIG. 3A, CEM 300 comprises one or more active phase components 302 and one or more collection enhancing components 304. The one or more collection enhancing components 304 comprise one or more low electrical resistivity components 306 and one or more magnetic susceptibility increasing components 308, either individually or in a combination of two or more thereof.

In one embodiment of the CEM 300 as illustrated in FIG. 3A, the active phase component 302 and the one or more collection enhancing components 304 are in contact. Optional additional collection enhancing components 304 are shown in phantom in FIG. 3A. In an embodiment, the one or more collection enhancing components 304 in contact with the active phase component 302 comprises one or more low electrical resistivity components 306. In another embodiment, the one or more collection enhancing components 304 in contact with the active phase component 302 comprises one or more magnetic susceptibility increasing components 308. In yet another embodiment, the one or more collection enhancing components 304 in contact with the active phase component 302 comprises one or more low electrical resistivity components 306 and one or more magnetic susceptibility increasing components 308. Embodiments of the invention are not limited by how one or more collection enhancing components 304 are in contact with the active phase component 302. In an embodiment, the one or more collection enhancing components 304 and the active phase component 302 are in contact in a manner such as, but not limited to, coating, incorporating, and embedding, etc., either individually or in combination of two or more thereof. For example, CEM 300 may comprise an active phase component 302 comprising an embedded collection enhancing component 304, an active phase component comprising 302 an incorporated collection enhancing component 304, and an active phase component 302 comprising at least a partial collection enhancing component coating, either individually or in combination of two or more thereof. Embodiments of the invention are also not limited by the shape, size, or form of the one or more collection enhancing components 304, the one or more low electrical resistivity components 306 and the one or more magnetic susceptibility increasing components 308, or by the shape, size, or form of the CEM 300 itself. Non-limiting examples of the form of the low electrical resistivity components 306, the magnetic susceptibility increasing components 308, and the CEM 300 include, but are not limited to, liquid, powder, and formed solid shapes such as microspheres, beads, and extrudates, either individually or in a combination of two or more forms. Furthermore, in some embodiments, the size or shape of the CEM 300 has varying dimensions of depth, width, and length.

In another embodiment of the CEM 300 as illustrated in FIG. 3A, the active phase component 302 includes one or more collection enhancing components 304. In an embodiment, the active phase component 302 comprises one or more collection enhancing components 304 such as one or more low electrical resistivity components 306. In another embodiment, the active phase component 302 comprises one or more collection enhancing components 304 such as one or more magnetic susceptibility increasing components 308. In yet another embodiment, the active phase component 302 comprises one or more collection enhancing components 304 such as one or more low electrical resistivity components 306 and one or more magnetic susceptibility increasing components 308. Embodiments of the invention are not limited by how one or more collection enhancing components 304 are part of the active phase component 302.

In an embodiment, low electrical resistivity components 306 include, but are not limited to, one or more inert ionic compounds. In another embodiment, low electrical resistivity components 306 include, but are not limited to, one or more cations and one or more anions, either individually or in combination of two or more thereof. Non-limiting examples of cations include elements such as from periodic table columns 1A, 2A, 3A, and 4A, either individually or in combination of two or more thereof. In one embodiment, non-limiting examples of anions include elements such as from periodic table columns 5B and 6B, either individually or in combination of two or more thereof. In another embodiment, low electrical resistivity components 306 include, but are not limited to, magnesium sulphate and calcium sulphate, either individually or in combination of two or more thereof.

In an embodiment, the low electrical resistivity component 306 has a characteristic of substantially maintaining the functionality of the active phase component 302. In another embodiment, the low electrical resistivity component 306 has a characteristic of remaining substantially affixed to the active phase component 302 during transport through a processing environment of the unit 200 to the particle removal device 208. In another embodiment, the low electrical resistivity component 306 has a characteristic of being substantially chemically stable under the operating conditions present in the reaction zone 202 of the unit 200.

Figure 4:
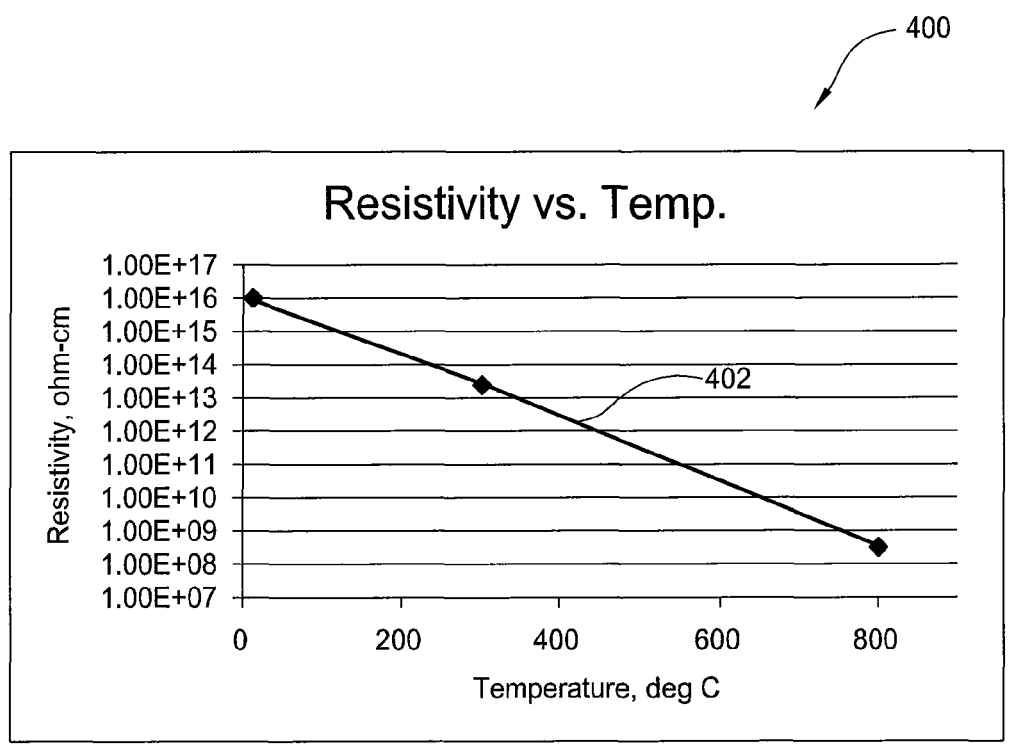
FIG. 4 is a graph of a low electrical resistivity component having less than or equal to about a resistivity value at a given temperature in accordance with an embodiment of the invention.

In another embodiment, low electrical resistivity components 306 include compositions having a resistivity about less than or equal to a resistivity value at a given temperature, for example, as illustrated in a graph 400 of resistivity and temperature provided in FIG. 4. In the embodiment illustrated in FIG. 4, the low electrical resistivity components 306 include compositions having a resistivity about less than or equal to a resistivity value at a given temperature as shown by line 402. In a particular embodiment, the low electrical resistivity component 306 has a resistivity value of less than or equal to about 2.00E+08 ohm-cm at a temperature of about 850 degrees Celsius. In another embodiment, the low electrical resistivity component 306 has a resistivity value of less than or equal to about 3.50E+08 ohm-cm at a temperature of about 800 degrees Celsius. In yet another embodiment, the low electrical resistivity component 306 has a resistivity value of less than or equal to about 3.00E+13 ohm-cm at a temperature of about 300 degrees Celsius. In another embodiment, the low electrical resistivity component 306 has a resistivity value of less than or equal to about 1.00E+16 ohm-cm at a temperature of about 14 degrees Celsius.

Figure 5:
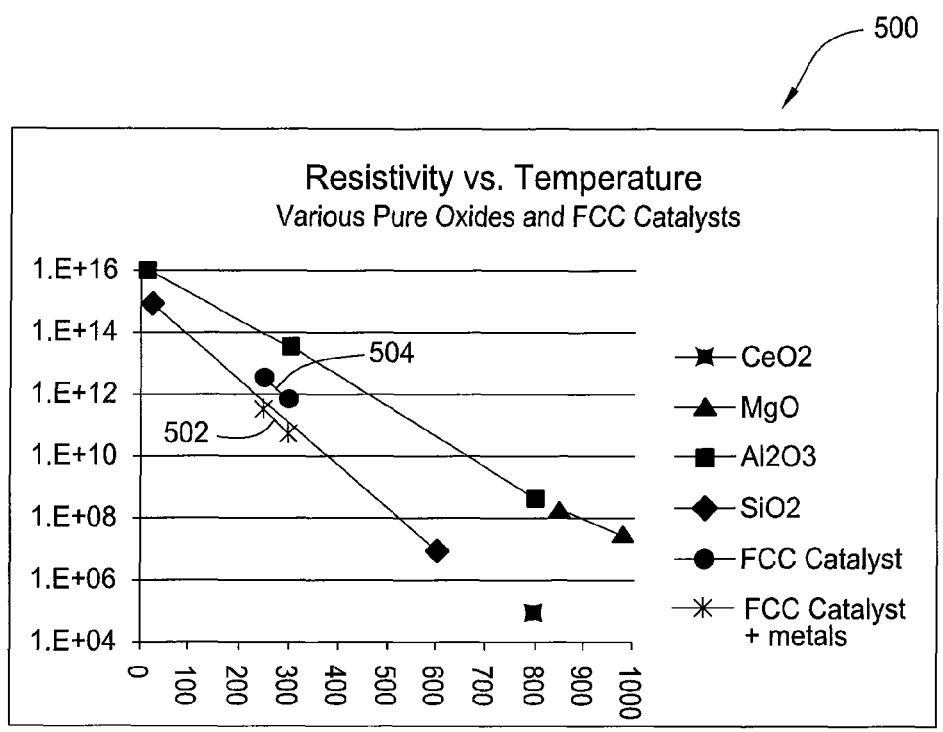
FIG. 5 is another graph of a low electrical resistivity component having less than or equal to about a resistivity value at a given temperature in accordance an embodiment of the invention.

In another embodiment as shown in a graph 500 illustrated in FIG. 5, low electrical resistivity components 306 include compositions having a resistivity about less than or equal to about a resistivity value at a given temperature as shown by line 502 illustrated in a graph 500 of resistivity and temperature provided in FIG. 5. Line 502 represents the resistivity value at a given temperature for CEM 300 having a metal low electrical resistivity component 306. Other embodiments of CEM 300 have resistivity values equal to or below the resistivity value indicated by line 502. The other lines for various other materials provided on graph 500 are provided for comparison, including an example of a conventional catalyst illustrated by line 504.

In another embodiment, the collection enhancing component 304 includes one or more magnetic susceptibility increasing components 308. Magnetic susceptibility increasing components 308 include iron, stable iron compounds, transition metals, and rare earth ions, either individually or in a combination of two or more thereof. Other magnetic susceptibility increasing components 308 include manganese, chromium, nickel, and cobalt, either individually or in a combination of two or more thereof. Virgin conventional catalysts and additives generally contain some iron, rare earths, or other magnetically active materials when they are made; however, this magnetism will be treated as "background" as the CEM 300 is relatively more magnetic through the inclusion of a magnetic susceptibility increasing component 308 that has the specifically intended characteristic of increasing the magnetism over and above the background level. In one embodiment for example, the magnetic susceptibility increasing component 308 has a magnetic susceptibility of at least about 500 cgs per atomic weight at about 20 degrees Celsius. It is known that conventional catalysts and additives may have magnetic material deposited while present within the unit. However, the virgin CEM 300 (and other materials of the invention) as described herein excludes materials which have been exposed to processes performed in the unit, and are thereby free of materials that may be deposited thereon during use inside a unit, for example, metals and coke deposited during cracking processes performed in an FCC unit. As such, the magnetic susceptibility increasing components 308 are part of the CEM 300 (and other materials of the invention) in its virgin state. In an embodiment, the magnetic susceptibility increasing component 308 comprises any stable reaction products of one or more magnetic susceptibility increasing components 308. In another embodiment, the magnetic susceptibility increasing component 308 comprises any stable reaction products of one or more magnetic susceptibility increasing components 308. In another embodiment, the collection enhancing component 304 comprises any stable reaction products of one or more low electrical resistivity components 306 and one or more magnetic susceptibility increasing components 308, either individually or in a combination of two or more thereof. In some embodiments, the particle removal device 208 is adapted to magnetically attract the CEM 300 when CEM 300 having increased magnetic susceptibility is utilized.

In an embodiment, CEM 300 comprises any stable reaction products of one or more collection enhancing components 304 and one or more active phase components 302. In another embodiment, the collection enhancing component 304 comprises any stable reaction products of one or more low electrical resistivity components 306 and one or more magnetic susceptibility increasing components 308, either individually or in a combination of two or more thereof.

In another embodiment, the active phase component 302 of the CEM 300 is in contact with the one or more collection enhancing components 304. In one embodiment, the combined weight percent of the one or more low electrical resistivity components 306 and/or one or more magnetic susceptibility increasing components 308 is in a range from greater than 0 to about 20 weight percent of the CEM 300. In another embodiment, the combined weight percent of the one or more low electrical resistivity components 306 and/or one or more magnetic susceptibility increasing components 308 is in a range from greater than 0 to about 15 weight percent of the CEM 300. In yet another embodiment, the combined weight percent of the one or more low electrical resistivity components 306 and/or one or more magnetic susceptibility increasing components 308 is in a range from greater than 0 to about 10 weight percent of the CEM 300. In a particular embodiment, the combined weight percent of the one or more low electrical resistivity components 306 and/or one or more magnetic susceptibility increasing components 308 is in a range from greater than 0 to about 5 weight percent of the CEM 300. When stating the combined weight percent of the one or more low electrical resistivity components 306 and/or one or more magnetic susceptibility increasing components 308 is in a range from a certain weight percentage of the CEM 300, the one or more such components 306, 308 may be embedded in, incorporated in, or coat the active phase component, and is not limited by how the component(s) is/are in contact with, or are part of the active phase component 302 of the CEM 300.

In an embodiment, each active phase component 302 with the one or more collection enhancing components 304 comprise properties independent of any other active phase component 302 of the CEM 300.

The above embodiments include an active phase component 302 with one or more collection enhancing components 304. In an embodiment, the one or more collection enhancing components 304 is in contact with at least one or more other collection enhancing components 304 which differ from each other to preferentially have a synergistic, unexpected combined effect of decreasing the electrical resistance of CEM 300 and/or increasing magnetic properties. In one embodiment, a plurality of collection enhancing components 304 which differ from each other, and have a synergistic, unexpected combined effect of decreasing the electrical resistance of CEM 300, increasing the magnetic properties of CEM 300, or both compared to conventional catalysts and additives.

The active phase component 302 comprises one of a host catalyst component or host additive component. In an embodiment, the host catalyst component or host additive component generally comprises a conventional catalyst or additive which is modified to include one or more low electrical resistivity components and/or one or more magnetic susceptibility increasing components thereby becoming the CEM 300, and thereby resulting in the CEM 300 having an enhanced collection efficiency by the particle removal device 208 as compared to a conventional unmodified catalyst or additive.

In an embodiment, the active phase component 302 of the CEM 300 comprises one or more collection enhancing components 304. The one or more collection enhancing components 304 comprises low electrical resistivity components 306 and/or the one or more magnetic susceptibility increasing components 308, either individually or in combination of two or more thereof. The one or more low electrical resistivity components 306 and/or the one or more magnetic susceptibility increasing components 308 modify the active phase component 302 by, but not limited to, a physical process step(s) rather than the changes in the actual weight percent content of active phase component 302. For example, modifying could refer to 1) the order of providing ingredients to the spray dryer slurry, such as providing the one or more low electrical resistivity components 306 and/or the one or more magnetic susceptibility increasing components 308 to the final slurry last or first; and 2) spraying a low electrical resistivity component 306 and/or magnetic susceptibility increasing component 308 on the active phase component 302 such that the low electrical resistivity component 306 and/or magnetic susceptibility increasing component 308 at least partially coats the active phase component 302, for example, with microspheres.

Advantages of the CEM 300 described above reduces the amount of PM escaping collection by the particle removal device 208 from the gaseous exhaust stream exiting the unit 200 through the exhaust system 204 since the portion of PM in the gaseous exhaust stream that comprises CEM 300 is readily collectable. Not to be limited by theory, gas and PM entrained in the gaseous exhaust stream enter the ESP of the particle removal device 208. High voltage discharge electrodes of the ESP ionize the gas molecules (negative ions/anions). The gas ions adsorb onto the surface of the PM, giving the PM a negative charge. Charged PM is attracted to and sticks to the collection plates of the ESP. As the collection plates of the ESP are grounded, the charge of the PM slowly dissipates. The collection plates are periodically "rapped" to cause the PM to drop off of the collection plate and fall to the bottom of the ESP, where the PM is collected and removed from the ESP.

Different gases, such as, but not limited to, $NH_3$, $SO_x$, $NO_x$, and $H_2O$, may be charged or ionized to varying degree. In one embodiment, such gases charge-up easily, thereby providing sufficient ions to increase the rate of charging-up of PM. For ESP efficiency, gases such as, but not limited to, $SO_x$, $NO_x$, and $H_2O$ are present in sufficient quantity to create enough ions to charge-up the PM quickly.

The "resistivity" of the PM is the property that determines how "resistant" the particles are to charging. PM having low resistivity is less resistant to charging, and consequently, more easily charged resulting in good capture efficiency by the ESP. Thus, PM having low resistivity, such as in certain embodiments of CEM 300, is desirable to enable better collection at the ESP.

In an embodiment of CEM 300, one or more collection enhancing components 304 are physically separate and distinct particles which means that the collection enhancing component 304 has a primary functionality distinct from the active phase component 302 in a single particle system.

In another embodiment in contrast to the multi-particle particle system, one or more collection enhancing components 304 are part of the CEM 300 as a single particle system. In an embodiment of the single particle system, the collection enhancing component 304 is in contact with and affixed to the active phase component 302. The collection enhancing components 304 may be affixed to the active phase component 302 by such as but not limited to incorporating, coating, and embedding the collection enhancing components 304 in or onto the active phase component 302. In yet another embodiment as a single particle system, the active phase component 302 has a primary functionality distinct from the primary functionality of the collection enhancing component 304. For comparative distinction, when collection enhancing components 304 are incorporated within or as part of the active phase component 302 in a single particle system instead of as physically separate and distinct particles from the active phase component 302 in a multi-particle particle system, dual or multiple characteristics of the active phase component 302 and the collection enhancing components 304 co-exist within the same single particle by virtue of the proximity of the components.

Collection Enhanced Catalysts (CEC)

Figure 3B:
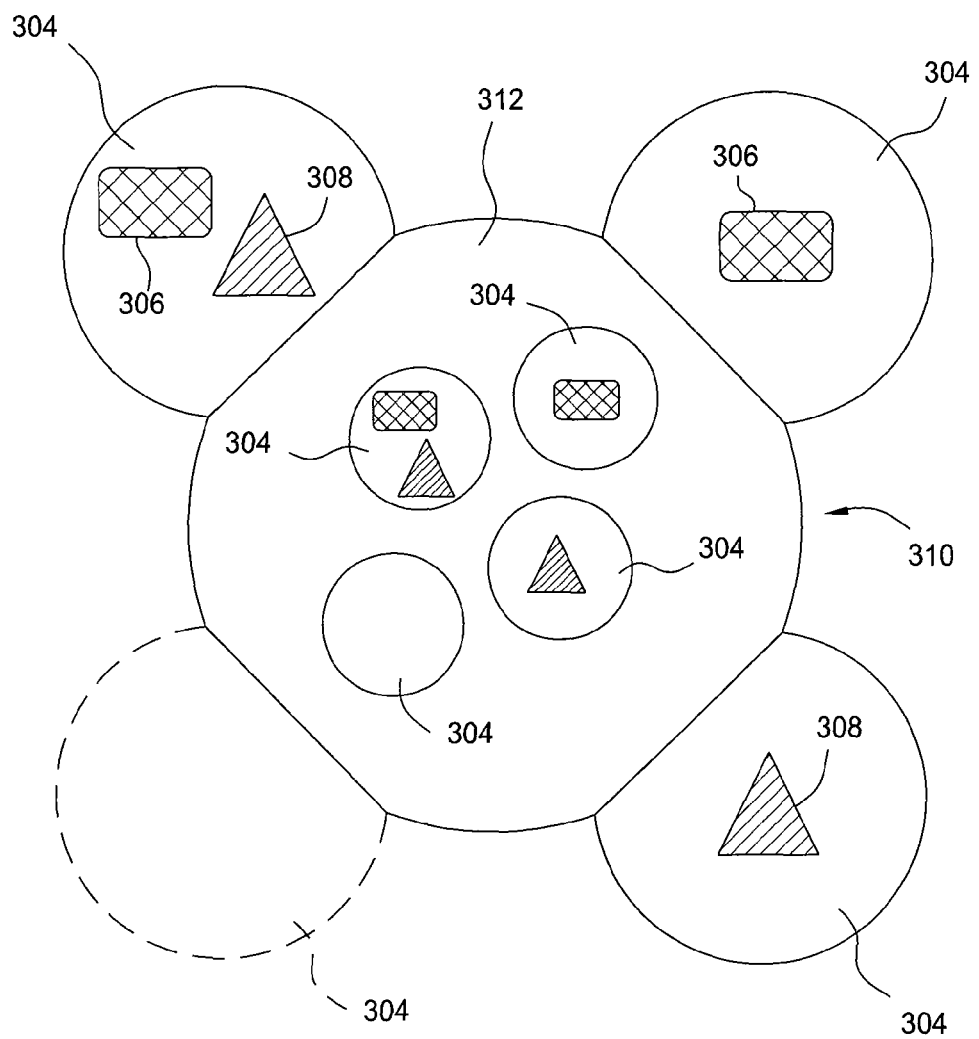
FIG. 3B is a simplified schematic of a collection enhanced material in accordance with another embodiment of the invention.

FIG. 3B schematically depicts CEC 310 according to an embodiment of the invention. In an embodiment, CEC 310 comprises an active phase component 312 and a collection enhancing component 304. In another embodiment, CEC 310 comprises any stable reaction products of one or more collection enhancing components 304 and one or more active phase components 312. In an embodiment, the collection enhancing component 304 comprises one or more low electrical resistivity components 306 and one or more magnetic susceptibility increasing components 308, either individually or in a combination of two or more thereof. The optional additional collection enhancing components 304 are shown in phantom in FIG. 3B.

In one embodiment, the active phase component 312 of the CEC 310 is in contact with the one or more collection enhancing components 304. In an embodiment, the one or more collection enhancing components 304 in contact with the active phase component 312 comprises one or more low electrical resistivity components 306. In another embodiment, the one or more collection enhancing components 304 in contact with the active phase component 312 comprises one or more magnetic susceptibility increasing components 308. In yet another embodiment, the one or more collection enhancing components 304 in contact with the active phase component 312 comprises one or more low electrical resistivity components 306 and one or more magnetic susceptibility increasing components 308. Embodiments of the invention are not limited by how one or more collection enhancing components 304 are in contact with the active phase component 312. In an embodiment, the one or more collection enhancing components 304 contact the active phase component 312 in a manner such as, but not limited to, coating, incorporating, and embedding, etc., either individually or in combination of two or more thereof. Embodiments of the invention are also not limited by the shape, size, or form of the one or more collection enhancing components 304, the one or more low electrical resistivity components 306 and/or the one or more magnetic susceptibility increasing components 308, or by the shape, size, or form of the CEC 310 itself. Non-limiting examples of the form of the one or more low electrical resistivity components 306, the one or more magnetic susceptibility increasing components 308, and/or the CEC 310 include, but are not limited to, liquid, powder, and formed solid shapes such as microspheres, beads, and extrudates, either individually or in a combination of two or more forms. Furthermore, in some embodiments, the size or shape of the CEC 310 has varying dimensions of depth, width, and length.

In another embodiment, the one or more collection enhancing components 304 are illustrated in FIG. 3B as part of the active phase component 312 of the CEC 310. In an embodiment, the one or more collection enhancing components 304 as part of the active phase component 312 comprises one or more low electrical resistivity components 306. In another embodiment, the one or more collection enhancing components 304 as part of the active phase component 312 comprises one or more magnetic susceptibility increasing components 308. In yet another embodiment, the one or more collection enhancing components 304 as part of the active phase component 312 comprises one or more low electrical resistivity components 306 and one or more magnetic susceptibility increasing components 308. Embodiments of the invention are not limited by how one or more collection enhancing components 304 are part of the active phase component 312.

Collection enhancing components 304 suitable for use in CEC 310 include the low electrical resistivity components 306 and increased magnetic susceptibility components 308 as described above, either individually or in a combination of two or more thereof. In one embodiment, the CEC 310 comprises one or more low electrical resistivity components 306 having a resistivity value less than or equal to 2.00E+08 ohm-cm at a temperature of 850 degrees Celsius. In another embodiment, the CEC 310 comprises one or more low electrical resistivity components 306 having a resistivity about less than or equal to about a resistivity value at a given temperature as shown by line 502 illustrated in a graph 500 of resistivity and temperature provided in FIG. 5. In yet another embodiment, the CEC 310 comprises one or more increased magnetic susceptibility components 308 having a magnetic susceptibility of at least about 500 cgs per atomic weight at about 20 degrees Celsius. In one embodiment, the active phase component 312 of CEC 310 comprises a zeolite, an inert material, and a binder. The inert material may be a clay, for example, kaolin. The binder may include alumina, silica alumina, or other suitable material, either individually or in a combination of two or more thereof.

Collection Enhanced Additives (CEA)

Figure 3C:
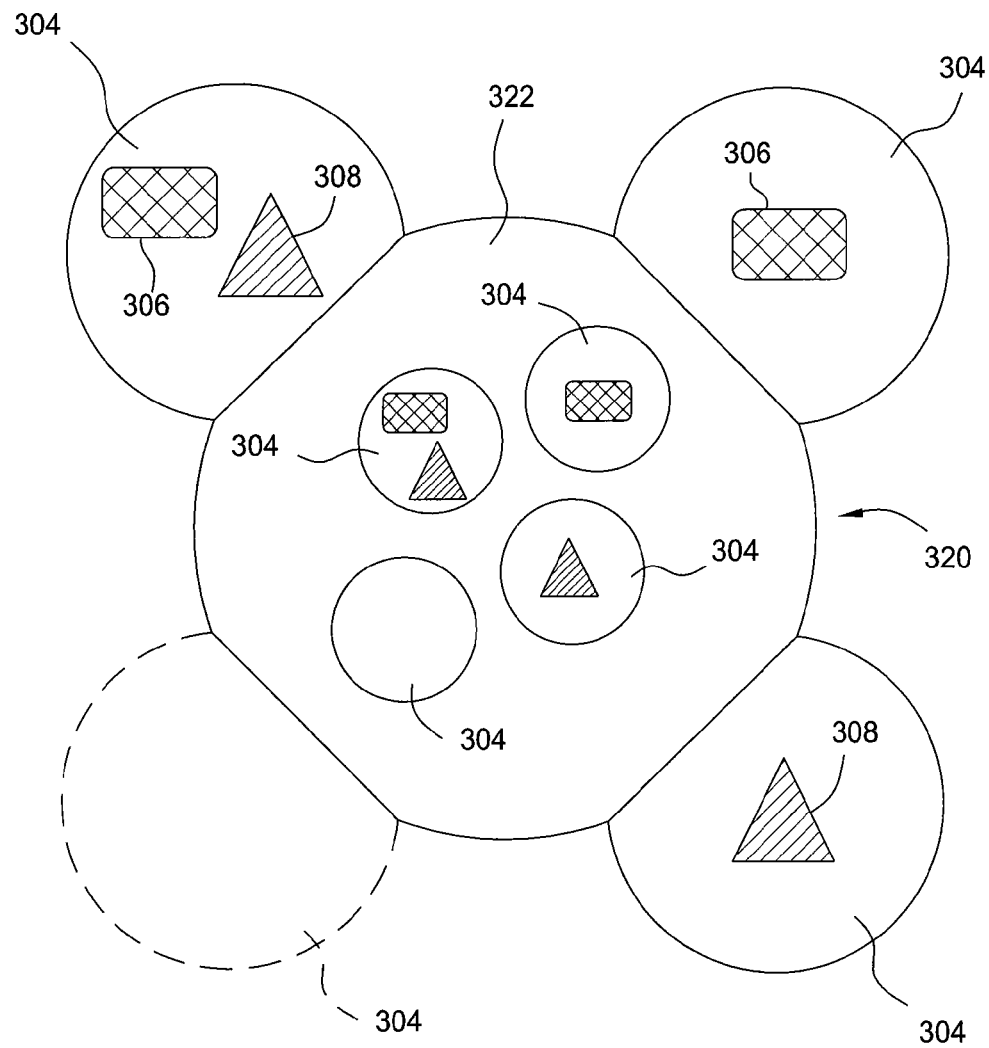
FIG. 3C is a simplified schematic of a collection enhanced material in accordance with another embodiment of the invention.

FIG. 3C schematically depicts CEA 320 according to an embodiment of the invention. In an embodiment, CEA 320 comprises an active phase component 322 and a collection enhancing component 304. In another embodiment, CEA 320 comprises any stable reaction products of one or more collection enhancing components 304 and one or more active phase components 322. In an embodiment, the collection enhancing component 304 comprises one or more low electrical resistivity components 306 and one or more magnetic susceptibility increasing components 308, either individually or in a combination of two or more thereof.

In one embodiment, the active phase component 322 of the CEA 320 is in contact with the one or more collection enhancing components 304. Optional additional collection enhancing components 304 are shown in phantom affixed to the active phase component 322 in FIG. 3C. In an embodiment, the one or more collection enhancing components 304 in contact with the active phase component 322 comprises one or more low electrical resistivity components 306. In another embodiment, the one or more collection enhancing components 304 in contact with the active phase component 322 comprises one or more magnetic susceptibility increasing components 308. In an embodiment, the one or more collection enhancing components 304 in contact with the active phase component 322 comprises one or more low electrical resistivity components 306 and one or more magnetic susceptibility increasing components 308. Embodiments of the invention are not limited by how one or more collection enhancing components 304 are in contact with the active phase component 322. In an embodiment, the one or more collection enhancing components 304 contact the active phase component 322 in a manner such as, but not limited to, coating, incorporating, and embedding, etc., either individually or in combination of two or more thereof. Embodiments of the invention are also not limited by the shape, size, or form of the one or more collection enhancing components 304, the one or more low electrical resistivity components 306 and/or the one or more magnetic susceptibility increasing components 308, or by the shape, size, or form of the CEA 320 itself. Non-limiting examples of the form of the one or more low electrical resistivity components 306, the one or more magnetic susceptibility increasing components 308, and/or the CEA 320 include, but are not limited to, liquid, powder, and formed solid shapes such as microspheres, beads, and extrudates, either individually or in a combination of two or more forms. Furthermore, in some embodiments, the size or shape of the CEA 320 has varying dimensions of depth, width, and length.

In another embodiment, the one or more collection enhancing components 304 are illustrated in FIG. 3C as part of the active phase component 322 of the CEA 320. In an embodiment, the one or more collection enhancing components 304 as part of the active phase component 322 comprises one or more low electrical resistivity components 306. In another embodiment, the one or more collection enhancing components 304 as part of the active phase component 322 comprises one or more magnetic susceptibility increasing components 308. In yet another embodiment, the one or more collection enhancing components 304 as part of the active phase component 322 comprises one or more low electrical resistivity components 306 and one or more magnetic susceptibility increasing components 308. Embodiments of the invention are not limited by how one or more collection enhancing components 304 are part of the active phase component 322.

Collection enhancing components 304 suitable for use in CEA 320 include the low electrical resistivity components 306 and increased magnetic susceptibility components 308 described above. In one embodiment, the CEA 320 comprises one or more low electrical resistivity components 306 having a resistivity value less than or equal to 2.00E+08 ohm-cm at a temperature of 850 degrees Celsius. In another embodiment, the CEA 320 comprises one or more increased magnetic susceptibility components 308 having a magnetic susceptibility of at least about 500 cgs per atomic weight at about 20 degrees Celsius.

In one embodiment, the active phase component 322 of CEA 320 comprises a functionality that reduces at least one of $SO_x$, $NO_x$, or other undesirable emission from the unit. In one embodiment, the active phase component 322 comprises a functionality that oxidizes $SO_2$ to $SO_3$ and absorbs $SO_3$. In another embodiment, the active phase component 322 for the reduction of $SO_x$ comprises a Mg-based pick-up agent and an oxidation catalyst, which may be Ce-based or V-based. The Mg-based pick-up agent may be a spinel, such as magnesium aluminum oxide, MgO solid solution structures, and a hydrotalcite. Other examples of active phase component 322 for reducing $SO_x$ include oxidants, such as magnesium, aluminum, Ce, Cr, Zr, V, and Fe, either individually or in a combination of two or more thereof.

In another embodiment, the active phase component 322 comprises a functionality that reduces $NO_x$ emissions. Active phase components 322 having a functionality that reduces $NO_x$ emissions may include high CeO content (i.e., greater than about 15 weight percent) alumina additives, Cerium supported on alumina, copper supported on zeolite, copper supported on alumina, and copper supported on hydrotalcite, and active metals on a support, either individually or in a combination of two or more thereof. In yet another embodiment, the active phase component 322 comprises a functionality that both reduces $SO_x$ and reduces $NO_x$.

Down Stream Additives (DSA)

Figure 6:
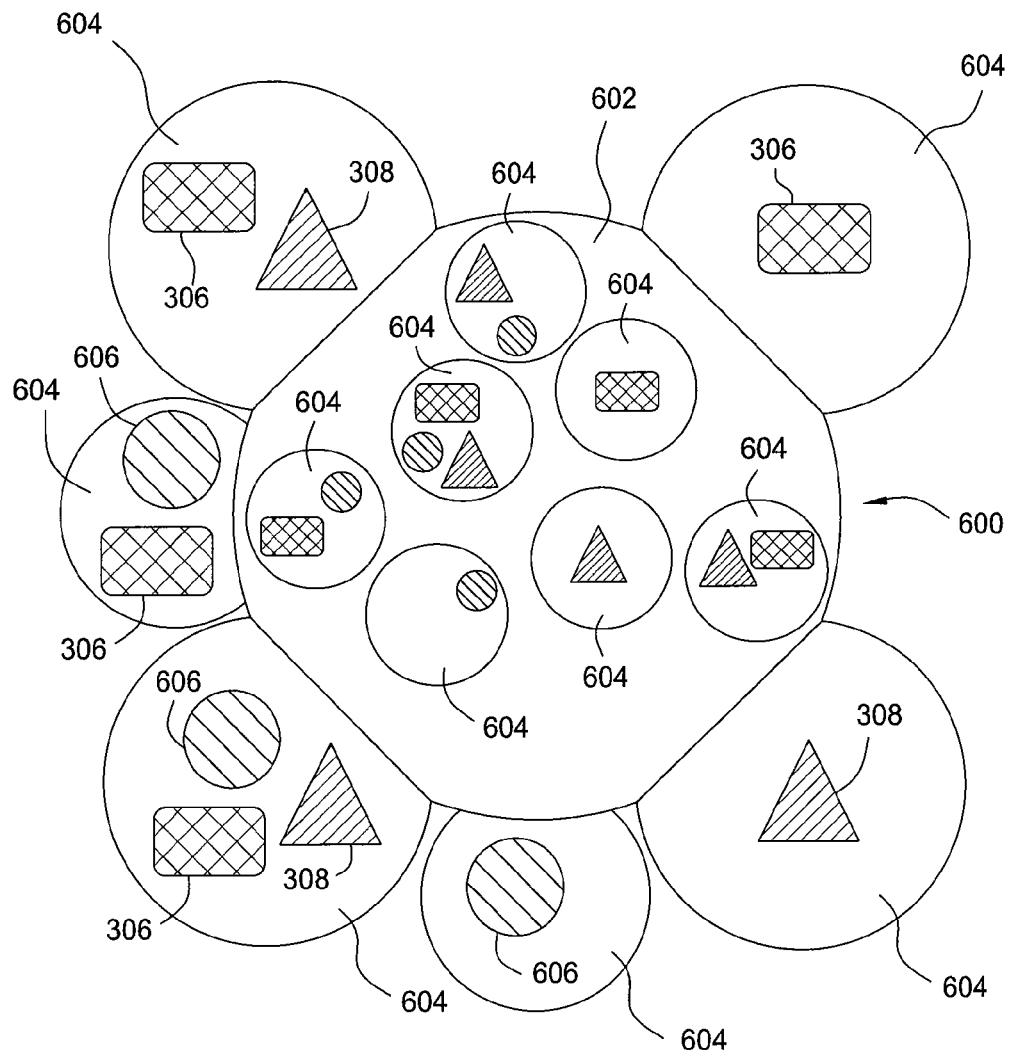
FIG. 6 is a simplified schematic of a flue gas additive in accordance with an embodiment of the invention.

Another group of materials of the present invention hereinafter referred to as down stream additive (DSA) is schematically illustrated in FIG. 6 as DSA 600. Generally, DSA 600 have a characteristic of enhancing collection of the DSA 600 by the particle removal device 208 from the exhaust stream exiting the unit 200 and/or reduces emissions in the exhaust stream of the unit 200 as shown in FIG. 2. DSA 600 as described herein is a virgin material, meaning that the material has never been exposed to a process for which it has been intended, for example, to an exhaust gas stream of a unit. In some embodiments, DSA 600 is recycled after exposure, and the term recycled DSA 600 will be utilized to provide distinction from virgin DSA 600. DSA 600 is generally first introduced into the exhaust stream passing through the exhaust system 204 without first passing through the unit 100 using the DSA addition system 210. In some embodiments, DSA 600 is also introduced to the reaction zone 202 of the unit 200 using a second conventional additive addition system 120. In the embodiments where DSA 600 is introduced to the reaction zone 202 of the unit 200, introduction to the reaction zone 202 of the unit 200 occurs after introduction of the DSA 600 to the exhaust system 204 in such that the DSA 600 is recycled DSA 600.

In an embodiment, DSA 600 comprises one or more active phase components 602 and one or more collection enhancing components 604. In an embodiment, DSA 600 comprises any stable reaction products of one or more collection enhancing components 604 and one or more active phase components 602. The one or more collection enhancing components 604 comprises one or more low electrical resistivity components 306, one or more magnetic susceptibility increasing components 308, and one or more clumping encouragement components 606, either individually or in combination of two or more thereof. Examples of suitable low electrical resistivity components 306 and magnetic susceptibility increasing components 308 identified above for use with CEM 300 are also suitable for use as a collection enhancing component in DSA 600.

In an embodiment, the one or more clumping encouragement components 606 comprises a characteristic that encourages clumping includes so-called fluxing agents, like vanadium, sodium, and calcium oxide, either individually or in combination of two or more thereof. Clumping of the DSA 600 within the exhaust stream increases the size and weight of the DSA 600, making the DSA 600 more easily removed from the exhaust gas stream, particularly by particle removal devices which may employ a cyclonic separator.

In one embodiment, the active phase component 602 of the DSA 600, when present, is in contact with the one or more collection enhancing components 604. Optional additional collection enhancing components 604 are shown in phantom affixed to the active phase component 602 in FIG. 6. In an embodiment, the one or more collection enhancing components 604 in contact with the active phase component 602 comprises one or more low electrical resistivity components 306. In another embodiment, the one or more collection enhancing components 604 in contact with the active phase component 602 comprises one or more magnetic susceptibility increasing components 308. In another embodiment, the one or more collection enhancing components 604 in contact with the active phase component 602 comprises one or more clumping encouragement components 606. In yet another embodiment, the one or more collection enhancing components 604 in contact with the active phase component 602 comprises one or more low electrical resistivity components 306, one or more magnetic susceptibility increasing components 308, and one or more clumping encouragement components 606, in a combination of two or more thereof. Embodiments of the invention are not limited by how one or more collection enhancing components 604 are in contact with the active phase component 602. In an embodiment, the one or more collection enhancing components 604 contact the active phase component 602 in a manner such as, but not limited to, coating, incorporating, and embedding, etc., either individually or in combination of two or more thereof. For example, DSA 600 may comprise an active phase component 602 comprising an embedded collection enhancing component 604, an active phase component comprising 602 an incorporated collection enhancing component 604, and an active phase component 602 comprising at least a partial collection enhancing component coating, either individually or in combination of two or more thereof. Embodiments of the invention are also not limited by the shape, size, or form of the one or more collection enhancing components 604, the one or more low electrical resistivity components 306, the one or more magnetic susceptibility increasing components 308, and/or the one or more clumping encouragement components 606, or by the shape, size, or form of the DSA 600 itself. Non-limiting examples of the form of the one or more low electrical resistivity components 306, the one or more magnetic susceptibility increasing components 308, the one or more clumping encouragement components 606 and/or the DSA 600 include, but are not limited to, liquid, powder, and formed solid shapes such as microspheres, beads, and extrudates, either individually or in a combination of two or more forms. Furthermore, in some embodiments, the size or shape of the DSA 600 has varying dimensions of depth, width, and length.

In another embodiment, the one or more collection enhancing components 604 are illustrated in FIG. 6 as part of the active phase component 602 of the DSA 600. In an embodiment, the one or more collection enhancing components 604 as part of the active phase component 602 comprises one or more low electrical resistivity components 306, one or more magnetic susceptibility increasing components 308, and one or more clumping encouragement components 606, either individually or in a combination of two or more thereof. Embodiments of the invention are not limited by how one or more collection enhancing components 604 are part of the active phase component 602.

In another embodiment, DSA 600 comprises an attrition index in the range of about two (2) to about ten (10), wherein the attrition index is determined according to ASTM D5057-10. In a particular embodiment, DSA 600 comprising an attrition index in the range of about two (2) to about ten (10) also comprises one or more collection enhancing components 604 affixed to the active phase component 602. The attrition index in the range from about two (2) to about ten (10) promotes the breaking of the virgin DSA 600 provided to the gaseous exhaust stream, thereby reducing the size of the DSA 600 while in the gaseous exhaust stream due to collision of the DSA 600 with the walls of the conduit 1004 and other PM (such as, but not limited to, other DSA 600). The high attrition index allows the particle size of the virgin DSA 600 to be large enough for efficient handling prior to entry into the gaseous exhaust stream, while once added to the gaseous exhaust stream, allows for an increase in the particle surface area and making more active phase components available for $NO_x$ and/or $SO_x$ reduction, or other emission control.

In another embodiment, DSA 600 has an average diameter in a range from about 20 μm to about 60 μm. In a particular embodiment, DSA 600 comprising average diameter in a range from about 20 μm to about 60 μm may also comprise an attrition index in the range from about two (2) to about ten (10), one or more collection enhancing components 604 affixed to the active phase component 602, either alone or in combinations thereof. Since the conventional catalyst/additive and catalyst/additive fines present in the exhaust stream typically have an average diameter in a range from less than about 10 μm to about 15 μm, which is much smaller than the dimension of DSA 600, the size differential between DSA 600 and conventional catalyst/additive and catalyst/additive fines allows DSA 600 to be preferentially removed from the gaseous exhaust stream. In the manner, the removed DSA 600 may be recycled without being diluted by other PM which may not include an active phase component. DSA 600 having smaller average diameters, such as in a range from about 20 μm to about 60 μm, results in greater surface area being available for emission control reactions, thereby enhancing the reactivity and/or absorption of the DSA 600.

However, DSA 600 having an average diameter in a range from about 20 μm to about 60 μm is an exemplary range and is not to be considered a limitation. In other embodiments, DSA 600 has an average diameter in a range from about 20 μm to about 300 μm, for example, from about 60 μm to about 300 μm. DSA 600 having an average diameter greater than about 60 μm provides greater ease of handling.

In another embodiment, the active phase component 602 of DSA 600 comprises a material incompatible with a process being performed in the unit having the exhaust gas stream into which the DSA 600 is added. Materials used in the active phase component 602 which are incompatible with a process performed in an FCC unit may cause a separate catalytic reaction that forms unwanted products like hydrogen and methane. Examples of materials used in the active phase component 602 which are incompatible with a process performed in an FCC unit may include but are not limited to copper, sodium, potassium, nickel, vanadium, and iron, either alone or in combinations of two or more thereof.

In an embodiment, the active phase component 602 of the DSA 600 has an emission reducing characteristic. In one embodiment, the active phase component 602 comprises one or more emission reducing components, such as, but not limited to, a $SO_x$ emission reducing component, and a $NO_x$ emission reducing component, either individually or in a combination of two or more thereof. For example, the active phase component 602 may comprise a $SO_x$ emission reducing component such as $SO_x$ removing additives which oxidize $SO_2$ to $SO_3$ and absorb $SO_3$. In an embodiment of the DSA 600, the active phase component 602 includes SOx removing additive comprising one or more sorbents and one or more oxidants.

In one embodiment of the $SO_x$ removing additive, non-limiting examples of sorbents include a spinel, a magnesium aluminum oxide crystallizing with a periclase structure, a precursor to a hydrotalcite or hydrotalcite-like material (HTL) wherein the precursor has an X-ray diffraction pattern displaying at least a reflection at a two theta peak position at about 43 degrees and about 62 degrees as described in U.S. Pat. No. 7,361,319 which is incorporated by reference herein in entirety, a hydrotalcite, an HTL, a dehydrated or dehydroxylated hydrotalcite, and a dehydrated or dehydroxylated HTL, as described in U.S. Pat. Nos. 7,361,319 and 6,028,023 which are incorporated by reference herein in entirety. It should be appreciated that embodiments of the invention include one or more sorbents such as a spinel, a magnesium aluminum oxide crystallizing with a periclase structure, a precursor to a hydrotalcite or HTL, a hydrotalcite, an HTL, a dehydrated or dehydroxylated hydrotalcite, and a dehydrated or dehydroxylated HTL, either individually or in a combination of two or more thereof.

In a particular embodiment, the sorbent includes a spinel, such as, but not limited to, $MgAl_2O_4$. Non-limiting examples, for illustration and not limitation, of various types of spinels are described in U.S. Pat. Nos. 4,469,589; 4,472,267; 4,492,677; 4,492,678; 4,613,428; 4,617,175; 4,735,705; 4,758,418; and U.S. Pat. No. 4,790,982 which are incorporated by reference herein in their entirety. Particular examples of various types of spinels include, for illustration and not limitation, those described in U.S. Pat. Nos. 4,790,982; 4,758,418; 4,492,678; and U.S. Pat. No. 4,492,677; which are incorporated by reference herein in their entirety. In a particular embodiment when the sorbent comprises substantially spinel, less than 100 percent of the oxidants to be in the $SO_x$ removing additive are in the slurry.

In a particular embodiment, the sorbent comprises $Al_2O_3$ and MgO. Portions of the $Al_2O_3$ and MgO may be chemically reacted or unreacted. The ratio of Mg/Al in the $SO_x$ removing additive may readily vary. In one embodiment, the sorbent comprises substantially aluminum and magnesium components. In one embodiment, the concentration of magnesium to aluminum ranges from about 0.25 to about 10 based on the total $SO_x$ removing additive on a molar basis. In a particular embodiment, the concentration of magnesium to aluminum ranges from about 0.5 to about 2, based on the total $SO_x$ removing additive on a molar basis. In yet another particular embodiment, the concentration of magnesium to aluminum ranges from about 0.75 to about 1.5, based on the total $SO_x$ removing additive on a molar basis.

The sorbent may comprise magnesium aluminum oxide. The magnesium aluminum oxide may crystallize with a spinel structure group. When the spinel includes a divalent metal (e.g., magnesium) and a trivalent metal (e.g., aluminum), the atomic ratio of divalent to trivalent metals in the spinel may range from about 0.17 to about 1, from about 0.25 to about 0.75, from about 0.35 to about 0.65, and from about 0.45 to about 0.55. In one embodiment, extra Mg content is present in the spinel structure such the Mg/Al ratio is higher.

In one embodiment, the sorbent comprises calcium aluminum oxide and magnesium aluminum oxide. In a particular embodiment, the sorbent comprises substantially calcium and aluminum components. In one embodiment, the concentration of calcium to aluminum ranges from about 0.25 to about 4, based on the total $SO_x$ removing additive on a molar basis. In a particular embodiment, the concentration of calcium to aluminum ranges from about 0.5 to about 2, based on the total $SO_x$ removing additive on a molar basis. In yet another particular embodiment, the concentration of calcium to aluminum ranges from about 0.75 to about 1.5, based on the total $SO_x$ removing additive on a molar basis.

In one embodiment, the sorbent portion also includes one or more divalent components, either based on magnesium and/or calcium, with a concentration of $Al_2O_3$ from about 18 percent to about 84 percent on a weight percentage basis, described above. The sorbent may crystallize in a periclase, a spinel, or other crystal structure group.

In another embodiment, the sorbent includes a hydrotalcite or hydrotalcite-like material (HTL). In a particular embodiment, the hydrotalcite or HTL may be collapsed, dehydrated and or dehydroxylated. Non-limiting examples and methods for making various types of HTL are described in U.S. Pat. Nos. 6,028,023; 6,479,421; 6,929,736; and U.S. Pat. No. 7,112,313; which are incorporated by reference herein in their entirety. Other non-limiting examples and methods for making various types of HTL are described in U.S. Pat. Nos. 4,866,019; 4,964,581; and U.S. Pat. No. 4,952,382; which are incorporated by reference herein in their entirety. Other methods for making hydrotalcite-like compounds are described, for example, by Cavani et al., Catalysis Today, 11:173-301 (1991), which is incorporated by reference herein in its entirety.

In another embodiment of the $SO_x$ removing additive, the sorbent comprises at least one hydrotalcite-like compound of formula (I) or formula (II):

$$(X^{2+}{}_m Y^{3+}{}_n(OH)_{2m+2n})A_{n/a}{}^{a-} \cdot bH_2O \quad (I)$$

$$(Mg^{2+}{}_m Al^{3+}{}_n(OH)_{2m+2})A_{n/a}{}^{a-} \cdot bH_2O \quad (II)$$

where X is magnesium, calcium, zinc, manganese, cobalt, nickel, strontium, barium, copper, or a mixture of two or more thereof; Y is aluminum, manganese, cobalt, nickel, chromium, gallium, boron, lanthanum, cerium, or a mixture of two or more thereof; A is $CO_3$, $NO_3$, $SO_4$, Cl, OH, Cr, I, $SiO_3$, $HPO_3$, $MnO_4$, $HGaO_3$, $HVO_4$, $ClO_4$, $BO_3$, or a mixture of two or more thereof; a is 1, 2, or 3; b is between 0 and 10; and m and n are selected so that the ratio of m/n is about 1 to about 10. The hydrotalcite-like compound of formula (II) can be hydrotalcite (i.e., $Mg_6Al_2(OH)16CO_3.4H_2O$). In one embodiment, the hydrotalcite-like compound of formula (I) or formula (II) can be used per se as the SOx removing additive.

In another embodiment of the $SO_x$ removing additive, the sorbent comprises a hydrotalcite-like compound of formula (III) or formula (IV):

$$X^{2+}{}_m Y^{3+}{}_n(OH)_{2m+2n})OH_n{}^- \cdot bH_2O \quad (III)$$

$$(Mg^{2+}{}_m Al^{3+}{}_n(OH)_{2m+2n})OH_n{}^- \cdot bH_2O \quad (IV)$$

wherein X is magnesium, calcium, zinc, manganese, cobalt, nickel, strontium, barium, copper, or a mixture of two or more thereof; Y is aluminum, manganese, cobalt, nickel, chromium, gallium, boron, lanthanum, cerium, or a mixture of two or more thereof; b is between 0 and 10; and m and n are selected so that the ratio of m/n is about 1 to about 10. In one embodiment, the compound of formula (IV) is $Mg_6Al_2(OH)_{18}.4.5H_2O$. The hydrotalcite-like compounds of formula (III) or formula (IV) can contain minor amounts of anionic (e.g., $CO_3$) impurities. In one embodiment, the hydrotalcite-like compound of formula (III) or formula (IV) can be used per se as the $SO_x$ removing additive.

When more than one sorbent is present, the plurality of sorbents may have various characteristics. For example, the sorbents may include a spinel, a magnesium aluminum oxide crystallizing with a periclase structure, a hydrotalcite, a hydrotalcite-like material (HTL), and a dehydrated or dehydroxylated HTL, either individually or in a combination of two or more thereof. In one embodiment, the sorbents may be chemically or physically separate and distinct from each other. In another embodiment, the sorbents may be chemically or physically reacted.

The sorbent may further comprise a support material. The support material may be adjusted based on the FCC environment such as high or low oxygen environment, mixed mode, or poor air distribution. Examples of support material include, but are not limited to, calcium aluminate, aluminum nitrohydrate, aluminum chlorohydrate, magnesia, silica, silicon-containing compounds (other than silica), alumina, titania, zirconia, clay, and a clay phosphate material, either individually or in a combination of two or more thereof. In one embodiment, the sorbent may be chemically or physically separate and distinct from the support material. In another embodiment, the sorbent may be chemically or physically reacted with the support material.

The sorbent may further comprise a hardening agent. Examples of hardening agents include, but are not limited to, aluminum silicate, magnesium aluminate, magnesium silicate, aluminum phosphate, and magnesium phosphate, either individually or in a combination of two or more thereof. Another example of sorbents includes magnesium and aluminum, either individually or in a combination of two or more thereof.

In one embodiment, at least one sorbent and at least one oxidant are distinct separate particle species as described in U.S. Pat. No. 6,281,164. In one embodiment, distinct separate particle species for respectively a sorbent and for an oxidant includes at least a first particle for the sorbent and at least a second particle for the oxidant. A need for relatively more $SO_x$ sorbent may occur when a $SO_x$ additive is provided to an FCC unit that is being used in a partial burn mode of operation.

In an embodiment of the $SO_x$ removing additive, examples of oxidants include metals and mineral oxidants, either individually or in a combination of two or more thereof. Examples of oxidants include one or more metals such as but not limited to, Ce, Fe, Mg, Al, Pt, Pd, Zr, Cu, Ba, Sr, Zn, Ca, Ni, Co, Mn, Cr, Mo, W, Ag, Cd, Bi, Sb, Dy, Er, Eu, Gd, Ge, Au, Ho, Ir, La, Pb, Mn, Nd, Nb, Os, Pr, Pm, Re, Rh, Ru, Sm, Sc, Se, Si, S, Ta, Te, Tb, Sn, Ti, W, Tm, and one or more mineral oxidants such as bastnaesite, either individually or in a combination of two or more thereof. In a particular embodiment, the oxidant comprises Ce. In an embodiment, Ce is in a range from about 0.1 weight percent to about 8.0 weight percent of the total $SO_x$ removing additive based on a $CeO_2$ loss free basis. In another embodiment, Ce is in a range from about 0.5 weight percent to about 4.0 weight percent of the total $SO_x$ removing additive based on a $CeO_2$ loss free basis. In yet another embodiment, the concentration of Ce is about 4 weight percent of the total $SO_x$ removing additive based on a $CeO_2$ loss free basis.

In another embodiment, the $SO_x$ removing additive includes a plurality of oxidants which differ from each other. The plurality of oxidants may have various characteristics. In one embodiment, the plurality of differing oxidants are in range from about 0.1 weight percent to about 8.0 weight percent of the total $SO_x$ removing additive based on an oxide loss free basis. In another embodiment, the plurality of differing oxidants are in a range from about 0.5 weight percent to about 4.0 weight percent of the total $SO_x$ removing additive based on an oxide loss free basis. In an embodiment, the plurality of differing oxidants are individually in a range from about 0.5 weight percent to about 2.0 weight percent of the total $SO_x$ removing additive based on an oxide loss free basis. In an embodiment, the plurality of differing oxidants are individually in a range from about 0.5 weight percent to about 1.0 weight percent of the total $SO_x$ removing additive based on an oxide loss free basis. In a particular embodiment, the plurality of differing oxidants are individually in a range from about 0.5 weight percent to about 4.0 weight percent of the total $SO_x$ removing additive based on an oxide loss free basis.

In another embodiment, oxidant includes group VIII metal such as platinum, palladium, iridium, osmium, rhodium, and ruthenium, either individually or in a combination of two or more thereof. In another embodiment, oxidants include MgO, $Al_2O_3$, CaO, BaO, $P_2O_5$, and $SiO_2$, either individually or in a combination of two or more thereof.

Another example of oxidants include Ce, Cr, Zr, V, and Fe, either individually or in a combination of two or more thereof. Furthermore, in a particular embodiment optimal oxidant to absorbent ratio (CeO:MgO) for DSA 600 will be different than the oxidant to absorbent ratio used for conventional $SO_x$ emission reducing additives provided to the reaction zone FCC unit.

In another embodiment, a sorbent and an oxidant are distinct separate particle species in a multiple particle system. In another embodiment, a sorbent and an oxidant are provided as a single particle system.

In an embodiment, the DSA 600 includes a plurality of the active phase component 602 such as Cu and $SO_x$ removing additives comprising a hydrotalcite like sorbent and cerium.

In an embodiment, the active phase component 602 may comprise a $NO_x$ emission reducing component such as $NO_x$ removing additives. In a particular embodiment, the DSA 600 includes a plurality of the active phase components 602 such as Ce and one or more $NO_x$ removing additives comprising one or more sorbents and one or more oxidants described above. In a particular embodiment, the DSA 600 includes a plurality of the active phase components 602 such as Ce and one or more $NO_x$ removing additives comprising a hydrotalcite like sorbent and Cu.

In another example, the active phase component 602 comprises a NO emission reducing component. In one embodiment, DSA 600 may include a $NO_x$ emission reducing component such as high CeO (>15 weight percent) content alumina additives, Cerium supported on zeolite, Cerium supported on alumina, copper supported on alumina, copper supported on hydrotalcite, and active metals on a support, either individually or in a combination of two or more thereof. Non-limiting advantages of the invention include, but are not limited to, the opportunity to reduce $NO_x$ emissions in a partial burn unit.

In some embodiments, the DSA 600 is substantially free of a regeneration component such as vanadium. In one embodiment, DSA 600 is substantially free of one or more reductant metals. In a particular embodiment, reductant metals include such as vanadium, iron compounds, either individually or in a combination of two or more thereof.

It should be noted that some raw materials used in the preparation of the DSA 600 may contain some level of such metals, particularly iron. In another embodiment, the DSA 600 is substantially free of iron, nickel, cobalt, manganese, tin, and vanadium, either individually or in a combination of two or more thereof. In another embodiment, the DSA 600 is substantially free of nickel, titanium, chromium, manganese, cobalt, germanium, tin, bismuth, molybdenum, antimony, and vanadium, either individually or in a combination of two or more thereof.

In one embodiment, the DSA 600 is substantially free of the presence of vanadium to an amount of less than about 1 percent by weight of the total DSA 600. "Substantially free" expressly allows the presence of trace amounts of the respective referred substance either individually or in a combination of two or more, such as vanadium or iron, and is not to be limited to a specified precise value, and may include values that differ from the specified value. In one embodiment, substantially free expressly allows the presence of trace amounts of vanadium. In a particular embodiment, substantially free expressly allows the presence of trace amounts of a respective referred substance, such as iron, nickel, cobalt, manganese, tin, and vanadium, by less than about 10 percent by weight, by less than about 5 percent by weight, by less than about 1 percent by weight, by less than about 0.5 percent by weight, and less than about 0.1 percent by weight, either individually or in combinations thereof. Substantially free expressly allows the presence of the respective trace amounts of vanadium, iron, etc., but does not require the presence of the referred substance, such as vanadium or iron.

An embodiment includes a method of providing the DSA 600 into the gaseous exhaust stream passing through the exhaust system 204 exiting the unit 200 to the flue stack 206 as shown in FIG. 2. The method includes at least one factor such as, but not limited to, continuity of providing the DSA 600, dispersion of the DSA 600, means of providing the DSA 600, and size of the DSA 600, either individually or in combination of two or more thereof. In another embodiment, the continuity of providing the DSA 600 includes providing the additive in less than 5 minute intervals, less than 3 minute intervals, less than 2 minute intervals, less than a 1 minute interval, and continuously providing DSA 600.

In another embodiment, dispersion of the DSA 600 means heterogeneity greater than 90 percent dispersion, greater than 95 percent dispersion, etc. Embodiments of the invention include various means of facilitating dispersion as known to one of ordinary skill in the art, such as, but not limited to, having multiple introduction points, liquid form, mixing, etc., and other dispersion techniques for providing fluidized material.

In another embodiment, DSA 600 may be provided at multiple introduction points, and at a plurality of points, either individually or in a combination of two or more thereof. DSA 600 may be in the form of a powder, slurry, or liquid. In another embodiment, average size of the DSA 600 is less than or equal to about 20 microns.

Embodiments of the invention include increasing or decreasing the amount of DSA 600 provided before an ESP but downstream of the reaction zone 202 of the unit in response to $SO_x$ levels in an FCC unit. Embodiments of the invention include metering the amount of DSA 600 provided before the ESP but downstream of the reaction zone 202 of the unit in response to $SO_x$ levels exiting the FCC unit.

Embodiments of the invention include ability to recycle DSA 600 provided before an ESP but downstream of the reaction zone 202 of the unit. Embodiments of the invention which include recycling include metering the amount of DSA 600 provided before the ESP but of the reaction zone 202 of the unit and metering the amount of the gas additive withdrawn and re-providing at least some of the withdrawn DSA 600 before an ESP but downstream of the reaction zone 202 of the unit. Embodiments of the invention include withdrawing an amount of DSA 600 before an ESP but downstream of the reaction zone 202 of the unit in response to $SO_x$ level in an FCC unit.

An embodiment of the invention includes providing DSA 600 before an ESP but downstream of reaction zone 202 of the unit, either individually or in a combination of two or more, to one or more fluidized units.

In an embodiment of DSA 600, one or more collection enhancing components 604 are physically separate and distinct particles which means that the collection enhancing component 604 has a primary functionality distinct from the active phase component 602 in a single particle system.

In another embodiment in contrast to the multi-particle particle system, one or more collection enhancing components 604 are part of the DSA 600 as a single particle system. In an embodiment of the single particle system, the collection enhancing component 604 is in contact with and affixed to the active phase component 602. The collection enhancing components 604 may be affixed to the active phase component 602 by such as but not limited to incorporating, coating, and embedding the collection enhancing components 604 in or onto the active phase component 602. In yet another embodiment of a single particle system, the active phase component 602 has a primary functionality distinct from the primary functionality of the collection enhancing component 604. For comparative distinction, when collection enhancing components 604 are incorporated within or as part of the active phase component 602 in a single particle system instead of as physically separate and distinct particles from the active phase component 602 in a multi-particle particle system, dual or multiple characteristics of the active phase component 602 and the collection enhancing components 604 co-exist within the same single particle by virtue of the proximity of the components.

DSA 600 is not limited by the form. For example, DSA 600 may be in the form of a powder, liquid, slurry, solution, dispersion or other form, either individually or in combination of two or more thereof.

A support phase component of powder DSA 600, i.e., the basic particle structure, may include without limitation, hydrotalcite, alumina (high acidic matrix catalyst), silica, silica alumina, $TiO_2$, active carbon, micro porous material (zeolites), and/or germanium aluminophosphate (AlPO), and/or pure active phase components without a separate support phase component, either individually or in combination of two or more thereof. The active phase component 602 of DSA 600 in powder form may be deposited on the support phase component or may be the support phase component itself. The active phase component 602 promotes absorption and catalytic mechanisms. Active phase component 602 comprise materials that include, by way of example and without limitation, lime, gypsum, salts, and AlPO-type materials without composition derived from their active components, among others. Non-limiting examples of salt include cations, anions, etc., such as, but not limited to, individually or in combination of two or more thereof. Examples of salts include cations (Na, K, Ca, Cu, Ni, W, Fe, V, transition metals, lanthanides (La, Ce)), anions ($CO_3$, $CHO_3$, oxides, hydroxides, and acetates), promoters, or other components, e.g., noble metals. The active phase component 602 may also include other types of catalytic materials. Examples of other catalytic materials that may be used as the active phase component 602 of the DSA 600 itself include $NH_3$.

Selective catalytic reduction (SCR)-type catalysts may also be utilized as the active phase component 602. SCR catalysts may have ceramic material carriers and active catalytic components. One example of a ceramic material carrier is titanium oxide. The active catalytic components may be oxides of base metals (such as vanadium and tungsten), zeolites, and various precious metals (ruthenium, rhodium, palladium, silver, osmium, iridium, platinum, and gold). Some examples of zeolite-based SCRs include iron- and copper-exchanged zeolite urea SCRs and vanadium-urea SCRs, either individually or in combination of two or more thereof SCR-type catalysts advantageously utilize less material, and makes double usage of existing $NH_3$ addition or introduction. For SCR-type catalysts, acidic supports may be beneficial, especially microporous zeolites, aluminas, and silica aluminas, either individually or in combination of two or more thereof.

As discussed above, DSA 600 comprises any stable reaction products of one or more collection enhancing components 604 and one or more active phase components 602. In an embodiment, collection enhancing components 604 comprises any stable reaction products of any combination of one or more low electrical resistivity components 306, one or more magnetic susceptibility increasing components 308, and one or more clumping encouragement components 606.

In an embodiment, DSA 600 is in a liquid or slurry form. Non-limiting examples of DSA 600 in liquid and/or slurry form include solutions of the above salts, ammonia and urea solutions, either individually or in combination of two or more thereof. Slurries and dispersions of the above solids allow smaller particle sizes, i.e., particles having an average diameter less than about 60 μm, to be added to the exhaust gas stream much more efficiently as compared to dry DSA 600 of the same size.

DSA 600 includes one or more physical characteristics such as, but not limited to, as discussed below. Examples of physical characteristics of DSA 600 include good $SO_x$ and/or $NO_x$ removal performance, which contribute to the reduction of unit emissions to the environment. Small particle size, such as having a diameter in a range from about 60 μm to about 300 μm, and high surface area of DSA 600 provides ample active sites available for reducing emissions. In an embodiment, the particles of DSA 600 may have a porous surface to increase the accessible surface area for improved $NO_x$ and/or $SO_x$ removal performance.

As discussed above, one embodiment of DSA 600 has a high attrition index as defined by ASTM D5757-10, i.e., an attrition index in a range from about two (2) to about ten (10) or greater. The high attrition index allows larger size particles to be utilized in the vessel addition system for ease of handling and dispensing, while promoting the fracture and size reduction with corresponding increase in surface area of the DSA 600 once entrained with flue gas within the conduit connecting the unit to the flue stack. In the conduit, the high attrition index promotes the fracture and splitting of the DSA 600 into smaller particles as DSA 600 collides with the conduit walls and other particles. The high attrition index and resulting particle size reduction within the conduit increases the efficiency of the $NO_x$ and/or $SO_x$ removal by increasing the exposed surface area of the DSA 600 exposed to the gaseous exhaust stream. In one embodiment, the ASTM D5057-10 attrition index is in a range from about two (2) to about ten (10). In another embodiment, the ASTM D5057-10 attrition index is greater than about ten (10).

In an embodiment, DSA 600 has a high bulk density. For example, the bulk density of DSA 600 exceeds about 1.0 grams/cc. In another embodiment, the bulk density of DSA 600 exceeds about 1.5 grams/cc.

In some embodiments as discussed above, DSA 600 comprises a modification that improves the retention of DSA 600 in at least one of the electrostatic precipitator or the third stage separator. In one example, DSA 600 comprises a modification that lowers the electrical resistivity of the DSA particles to differ from the electrical resistivity of catalyst fines present in the exhaust gas stream. In an embodiment, DSA 600 is modified to have an electrical resistivity to be less than about $1 \times 10^8$ ohm-cm at 850 degrees Celsius to promote separation in the first stage of the electrostatic precipitator preferentially to the catalyst fines. In another embodiment, the magnetic susceptibility of DSA 600 is modified to increase the retention of DSA 600 in the first stage of the electrostatic precipitator as discussed above. In another embodiment, the DSA 600 is modified to encourage clumping/aggregation of the DSA 600. For example, a modification to encourage clumping may be balanced with a high attrition index, such that particles of DSA 600 which fracture and break-up upon entry into the gaseous exhaust stream to promote $NO_x$ and/or $SO_x$ removal may reclump downstream to make collection of the DSA 600 present in the exhaust gas stream more efficient by increasing the particle size of the fractured DSA 600 prior to interfacing with the particle retention device.

As discussed above, an embodiment of DSA 600 is in powder form and includes AlPOs. AlPOs are aluminophosphates with zeolite type structures (highly microporous, high zeolite surface area, etc.). A wide range of AlPOs compositions may be utilized, where the active components are in the framework of the zeolite type structure. Active components that are microporous materials provide extremely high surface area which beneficially enhances performance for the DSA 600. As with zeolites, AlPOs can be exchanged to include other components within the micropores. Such AlPO materials in the channels of the micropores could also be catalytically active or promote an active framework.

Table I includes exemplary chemical compositions of alternative DSAs.

TABLE II $NO_x$ and $SO_x$ Reduction of Virgin DSA Additives

| Name | $NO_x$ Reduction, % | $SO_x$ Reduction, % |
|---|---|---|
| DSA-2 | Complete | Complete |
| DSA-6 | 90% | Complete |
| DSA-5 | 80% | Complete |
| DSA-3 | 5% | 95% |
| DSA-4 | 70% | Complete |

TABLE III $NO_x$ and $SO_x$ Reduction of Virgin DSA-2/Diluent Mixtures at Different Concentrations

| Material | Concentration, wt % | $NO_x$ Reduction, % | $SO_x$ Reduction, % |
|---|---|---|---|
| DSA-2 | 100 | Complete | Complete |
|  | 10 | 55% | Complete |
|  | 5 | 10% | 90% |
|  | 1 | 0% | 20% |

TABLE IV $NO_x$ and $SO_x$ Reduction of DSA-1 at Different Temperatures

| Material | Temperature, C. | $NO_x$ Reduction, % | $SO_x$ Reduction, % |
|---|---|---|---|
| DSA-1 | 65 | Complete | Complete |
| DSA-1 | 250 | 55% | Complete |

TABLE I

DOWN STREAM ADDITIVES

| | Composition, wt % | | | | | | | | | Particle Size Distribution | | | |
|---|---|---|---|---|---|---|---|---|---|---|---|---|---|
| Name | $SiO_2$ | $Al_2O_3$ | MgO | CaO | $CeO_2$ | $V_2O_5$ | $TiO_2$ | $Fe_2O_3$ | $K_2O$ | CuO | 0-20 um, % | 0-40 um, % | 0-80 um, % | APS, um |
| DSA-1 Fine | 30.5 | 64 | — | 0.4 | — | — | 1.5 | 0.6 | 3 | | 16 | 50 | 72 | 40 |
| DSA-1 Coarse | | | | | | | | | | | 1.7 | 7 | 36 | 99 |
| DSA-2 Fine | | 23 | 55 | 0.8 | | | | | | 21.2 | 3.7 | 30 | 89 | 51 |
| DSA-2 Coarse | | | | | | | | | | | 0.4 | 3 | 42 | 85 |
| DSA-2.5 Coarse | | 20.5 | 52.5 | 0.9 | 8.6 | 0.4 | | 0.2 | | 16.9 | 1 | 4 | 45 | 87 |
| DSA-5 Fine | | 24.5 | 54.5 | 21 | | | | | | | 6.7 | 58 | 94 | 37 |
| DSA-5 Coarse | | | | | | | | | | | 2.1 | 5 | 38 | 93 |
| DSA-6 Fine | | 21.5 | 63.6 | 0.9 | 11.5 | 2.5 | | | | | 17 | 86 | 100 | 29 |
| DSA-6.5 Coarse | | 19.5 | 57 | 0.8 | 10.4 | 2.3 | | | | 10 | 1 | 8 | 40 | 95 |

DSA 600 of Table I were tested in a test rig that simulates addition of DSA 600 to the exhaust system of a unit, such as illustrated in FIG. 2. The test rig includes a 1-4 gram bed of DSA 600 disposed in a vertical quartz tube reactor. 130 ml/min of a sample gas was provided through the bed at temperatures ranging from about 25 degrees Celsius to about 650 degrees Celsius. The sample gas included about 2035 ppm $SO_2$, about 500 ppm NO, and about 2 percent $O_2$, with the balance being $N_2$. After passing through the DSA 600 bed disposed in the test rig, the sample gas was tested using a gas analyzer to determine changes in composition. Tables II-IV illustrate test results for various embodiments of DSA 600 tested as described above. As shown in Table II, significant $NO_x$ and $SO_x$ reduction (i.e., reduction greater than or equal to about 70 percent) was observed for most samples after about 600 seconds of exposure to the sample gas at about 250 degrees Celsius.

As shown in Table IV, $NO_x$ and $SO_x$ reduction was tested at different dilutions using an inert material added to the bed of DSA 600. More than 50 percent $NO_x$ reduction and substantially complete $SO_x$ reduction was observed after about 600 seconds of exposure to the sample gas at about 250 degrees Celsius with concentrations of DSA 600 of 10 percent, with $NO_x$ and $SO_x$ reduction diminishing with increased dilution. Table IV illustrates the effect of reaction temperature on $NO_x$ and $SO_x$ absorption using DSA 600 comprising about 6 percent $KHCO_3$ as an active phase component on a support phase component. The tests indicate increased performance at higher temperatures after about 600 seconds of exposure of the bed of DSA 600 to the sample gas.

TABLE V $NO_x$ and $SO_x$ Reduction of DSA-2.5 and DSA-6.5

| Name | $NO_x$ Reduction, % | $SO_x$ Reduction, % |
|---|---|---|
| DSA-2.5 | 85 | Complete |
| DSA-6.5 | 85 | N/A |

The performance of DSA-2.5 and DSA-6.5 was tested using a 2 gram bed of the subject DSA disposed in a vertical quartz tube reactor. 130 ml/min of a sample gas was provided through the bed at 250 degrees Celsius. The sample gas included about 800 ppm $SO_2$, about 400 ppm NO, about 2 percent $O_2$, and about 1 percent $H_2O$, with the balance being $N_2$. After passing through the bed of DSA, the sample gas was tested using a mass spectrometer to determine changes in composition. Tables V illustrate test results for various embodiments of DSA 2.5 and 6.5 tested as described above. As shown, significant $NO_x$ and $SO_x$ reduction was observed for these samples after about 300 seconds of exposure to the sample gas at about 250 degrees Celsius.

Method of Making Collection Enhanced Materials (CEM)

Figure 7:
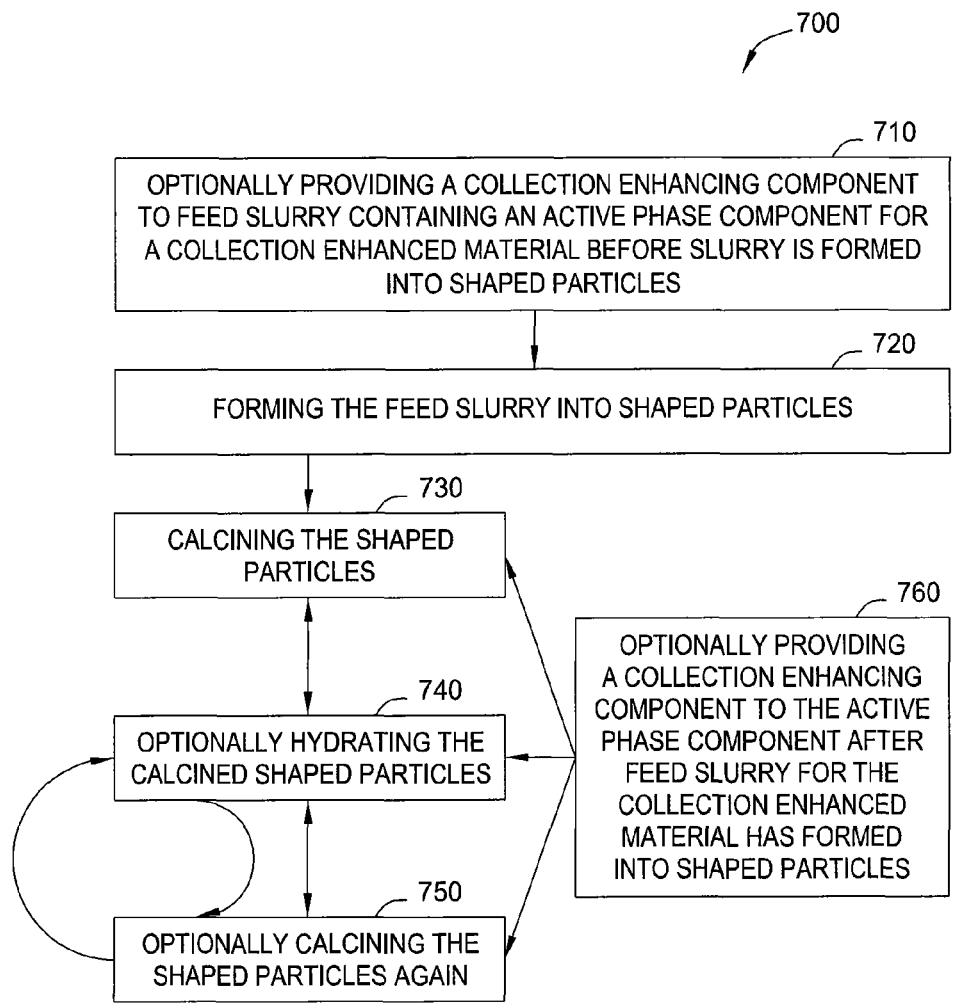
FIG. 7 is a flow diagram of a method for making collection enhanced material in accordance with another embodiment of the invention.

For illustration and not limitation, FIG. 7 is a flow diagram of a method 700 of making CEM 300 in accordance with another embodiment of the invention. The method 700 is not limited by the order or frequency of the steps unless expressly noted. As depicted in FIG. 7, the method 700 of making CEM 300 begins at step 702 by optionally providing a collection enhancing component 304 to a feed slurry containing an active phase component 302 for a CEM 300 before the feed slurry is formed into shaped particles. Step 720 comprises forming the slurry into shaped particles. The slurry may be formed into shaped particles by techniques such as, but not limited to, spray drying, granulation, extrusion, and pelletization, either individually or a combination of two or more thereof. The method is also not limited by the form of the shaped particles. Examples of form of shaped particles include, but are not limited to, particles, grains, pellets, powders, extrudate, spheres, and granules, either individually or in a combination of two or more. In one embodiment, the shaped particles are in the form of microspheres. Step 730 comprises calcining the shaped particles. Step 740 comprises optionally hydrating the calcined shaped particles. Step 750 comprises optionally calcining the microspheres again. Steps 740, 750 may be repeated as desired. Step 760 comprises optionally providing a collection enhancing component 304 to the active phase component 302 after feed slurry for the CEM 300 has formed into shaped particles. Although the collection enhancing component 304 is described as optionally provided in both steps 710, 760, providing collection enhancing component 304 to the active phase component 302 is provided in at least one of steps 710, 760 during the method 700. Providing a collection enhancing component 304 to the active phase component 302 at step 760 may be achieved by techniques such as, but not limited to, hydration and impregnation.

For example, in an embodiment, the optional collection enhancing component 304 is provided at step 710 to the feed slurry prior to forming shaped particles. In another embodiment, the optional collection enhancing component 304 is provided at step 760 while forming the shaped particles at step 720. In another embodiment, the optional collection enhancing component 304 is provided at step 760 while calcining the shaped particles at step 730. In another embodiment, the optional collection enhancing component 304 is provided at step 760 while hydrating the calcined shaped particles at step 740. In another embodiment, the optional collection enhancing component 304 is provided at step 760 while calcining the hydrated shaped particles at step 750. In another embodiment, the collection enhancing component 304 is provided at step 710 and at step 760, wherein step 760 may be performed one or more times. In yet another embodiment, the method includes repeating step 760 providing the optional collection enhancing component at desired frequency intervals and as many times as desired, such as, but not limited to, after steps 710, 720, 730, 740, and 750, either individually or a combination of two or more thereof.

Method of Making Down Stream Additives (DSA)

Figure 8:
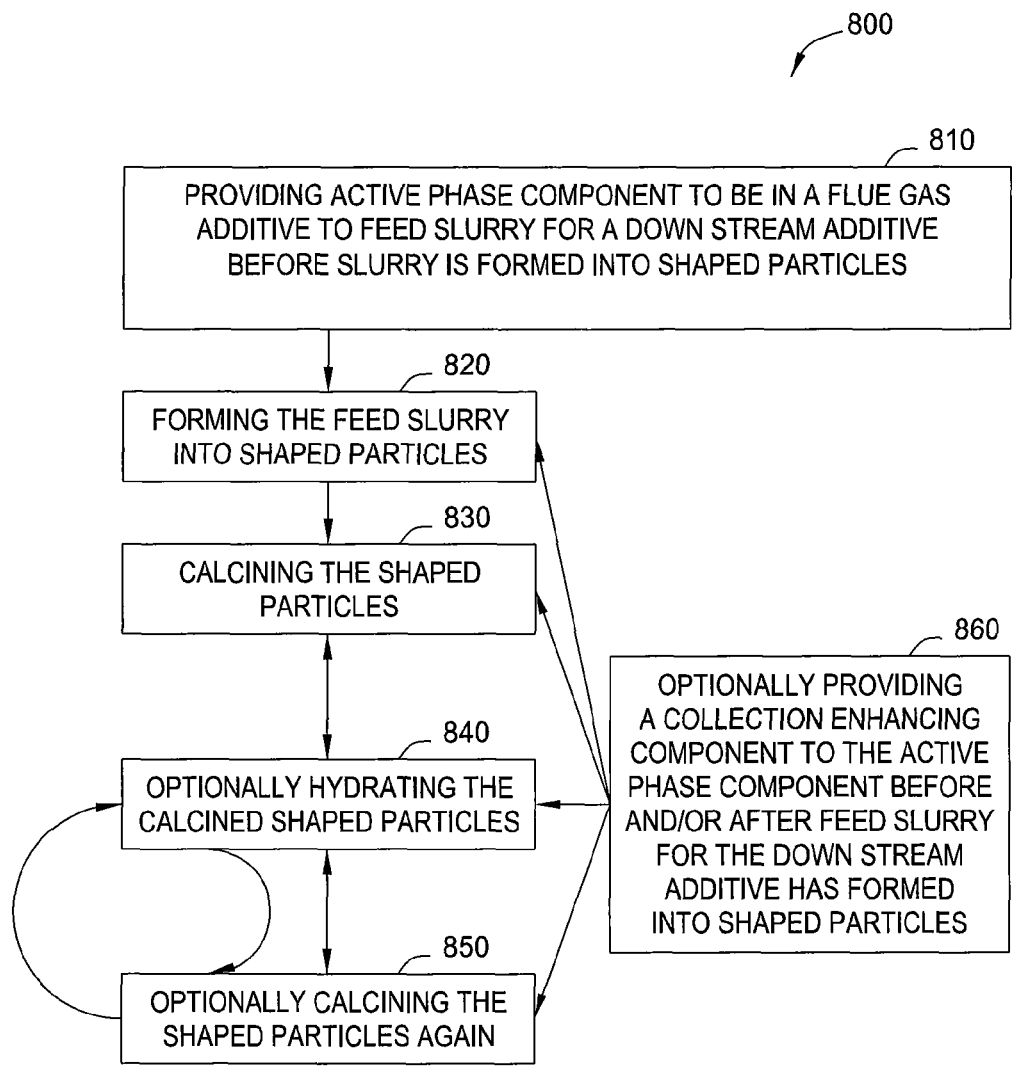
FIG. 8 is a flow diagram of a method for making collection enhanced material in accordance with another embodiment of the invention.

For illustration and not limitation, FIG. 8 is a flow diagram of a method 800 of making DSA 600 in accordance with another embodiment of the invention. The method 800 is not limited by the order or frequency of the steps unless expressly noted. The method 800 begins at step 810 by providing an active phase component 602 to be in a DSA 600 to feed slurry for the DSA 600 before slurry is formed into shaped particles. Step 820 comprises forming the slurry into shaped particles. The slurry may be formed into shaped particles by techniques such as, but not limited to, spray drying, granulation, extrusion, and pelletization, either individually or a combination of two or more thereof. The method is also not limited by the form of the shaped particles. Examples of form of shaped particles include, but are not limited to, particles, grains, pellets, powders, extrudate, spheres, and granules, either individually or in a combination of two or more. In one embodiment, the shaped particles are in the form of microspheres. Step 830 comprises optionally calcining the shaped particles. Step 840 comprises optionally hydrating the calcined shaped particles. Step 850 comprises optionally calcining the microspheres again. Steps 840, 850 may be repeated as desired. Step 860 comprises optionally providing a collection enhancing component 304 to the active phase component 302 before and/or after the feed slurry for the DSA 600 is formed into shaped particles.

For example, in an embodiment, the optional collection enhancing component 304 is provided at step 810 to the feed slurry prior to forming shaped particles. In another embodiment, the optional collection enhancing component 304 is provided at step 860 while forming the shaped particles at step 820. In another embodiment, the optional collection enhancing component 304 is provided at step 860 while calcining the shaped particles at step 830. In another embodiment, the optional collection enhancing component 304 is provided at step 860 while hydrating the calcined shaped particles at step 840. In another embodiment, the optional collection enhancing component 304 is provided at step 860 while calcining the hydrated shaped particles at step 850. In another embodiment, the collection enhancing component 304 is provided at step 810 and at step 860, wherein step 860 may be performed one or more times. In yet another embodiment, the method includes repeating step 860 providing the optional collection enhancing component at desired frequency intervals and as many times as desired, such as, but not limited to, before and/or after steps 810, 820, 830, 840, and 850, either individually or a combination of two or more thereof.

Down Stream Addition Systems

Figure 9:
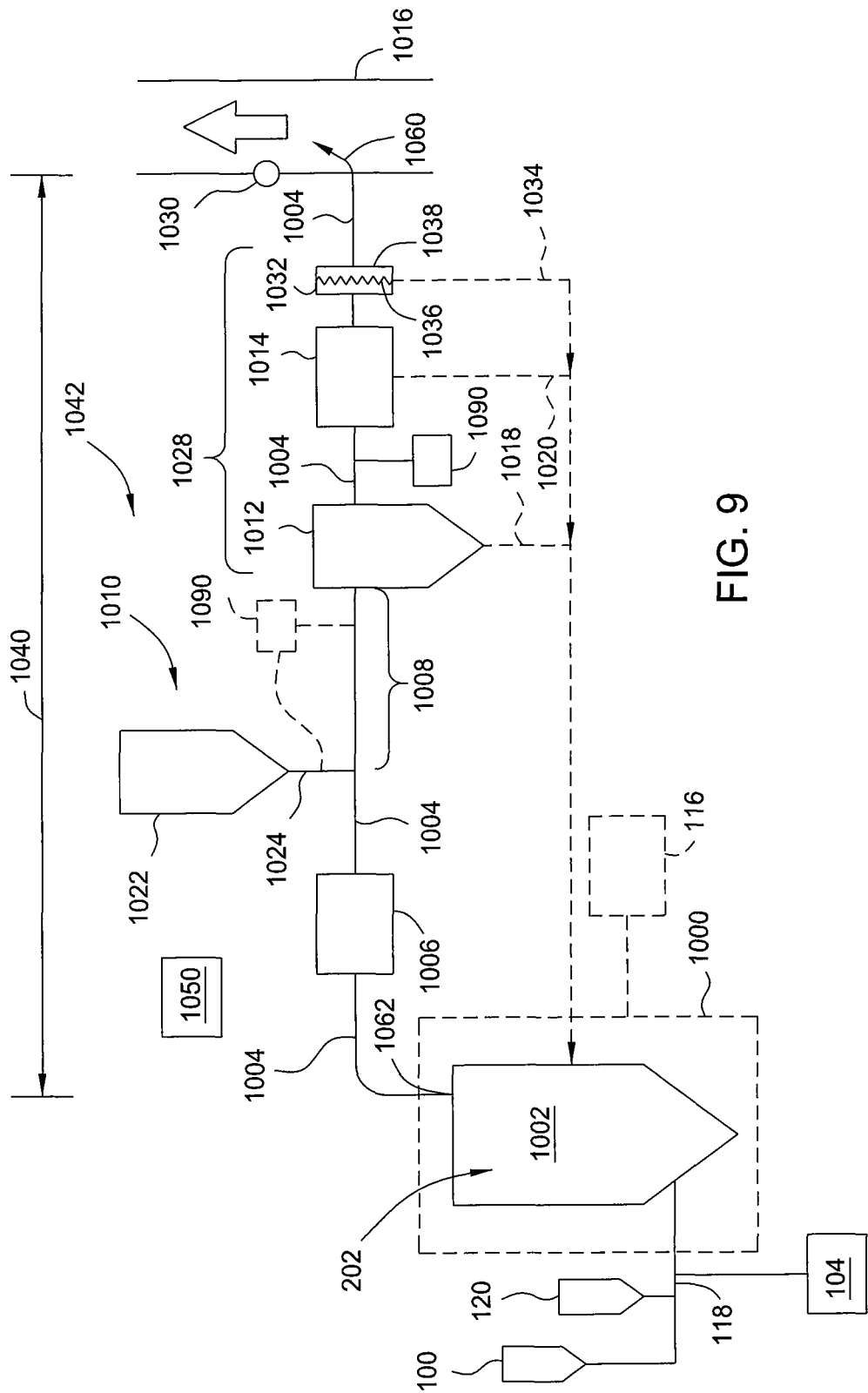
FIG. 9 is a schematic diagram of an addition system integrated with a flue gas exhaust gas stream in accordance an embodiment of the invention.

FIG. 9 depicts one embodiment of a down stream addition system 1010 interfaced with an exhaust gas stream 1060 of a fluidized unit 1000. The fluidized unit 1000 is for illustration, and may alternatively be another type of unit. For example as recited herein, a "unit" refers to, but is not limited to, an FCC unit, a fixed bed or moving bed unit, a bubbling bed unit, a unit suitable for the manufacture of pyridine and its derivatives, a unit suitable for the manufacture of acrylonitrile, and other units suitable for industrial processes, etc., either individually or in a combination of two or more thereof. In a particular embodiment, the material of the present invention is provided to a plurality of units that are FCC units. The FCC unit is adapted to promote catalytic cracking of feed stock provided from a source and may be configured in a conventional manner. In another embodiment, the material of the present invention is provided to units designed to crack gasoline range feed stocks into Liquefied Petroleum Gas (LPG) such as, but not limited to, Superflex™ process, or crack heavy feed into LPG instead of gasoline such as, but not limited to, Indmax™ process. In another particular embodiment, the material of the present invention is provided to units for processing acrylonitrile. An example of a unit suitable for the manufacture of acrylonitrile is a fluidized bed process. Similar units are also used for manufacturing other chemicals such as pyridine. The unit may also be a processing plant having a flue gas exhaust stream in which particle reduction and/or flue gas emission reduction is desirable. In an embodiment, the unit may be in the form of a processing plant in which it would be desirable to have particle reduction and/or flue gas emission reduction in a gaseous exhaust gas stream. Non-limiting examples of such processing plants include plants having gas streams from scrubbers that emit/capture sodium sulfate or other pollutant, carbon black producing plants, fluid cokers, and biofuel plants, among others.

In an embodiment, the exhaust gas stream 1060 of the fluidized unit 1000 exits a regenerator 1002 of an FCC unit. The exhaust gas stream 1060 is routed along a gaseous exhaust path 1040 defined between an outlet 1062 of the fluidized unit 1000 and a flue gas stack 1016 of an exhaust system 1042 of the unit 1000. In the embodiment depicted in FIG. 9, the gaseous exhaust path 1040 includes a pipe or conduit 1004 coupled to the outlet 1062 of the fluidized unit 1000. The conduit 1004 is interfaced with one or more particle removal devices 1028. Examples of particle removal devices 1028 include, but are not limited to, a third stage separator 1012, an electrostatic precipitator 1014 and filtration device 1032, either individually or combinations of two or more thereof. As shown in FIG. 9, three particle removal devices 1028 (i.e., third stage separator 1012, electrostatic precipitator 1014, and filtration device 1032) are arranged in series. The number, type and sequence of the one or more particle removal devices 1028 may be arranged to suit particular particle needs of the exhaust stream. The exhaust gas stream 1060 exits the electrostatic precipitator 1014 through the conduit 1004 into the flue gas stack 1016. In another embodiment, the one or more particle removal devices 1028 include an ESP modified for magnetic material removal or particle removal device operable to magnetically remove magnetic PM, such as high gradient magnetic field separators and carousel magnetic separators. Examples of a particle removal device operable to magnetically remove magnetic PM are described in U.S. Pat. No. 4,407,773.

In an embodiment, the flue gas stack 1016 includes a sensor 1030 that provides a metric indicative of the composition of the exhaust gas stream 1060. The metric indicative of the composition of the exhaust gas stream 1060 is provided to a controller 1050 which controls the operation of the down stream addition system 1010 such that the amount of DSA 600 provided to the exhaust gas stream 1060 is adjusted in response to the metric provided by the sensor 1030, for example, by decreasing the amount of DSA 600 provided as emission of a pollutant diminishes or increasing the amount of DSA 600 provided as emission of a pollutant increases.

In an embodiment, the controller 1050 additionally includes a communication device, such as a modem or antenna, which allows the controller 1050 to provide information to a remove device, such as a computer residing in a location far removed from the hazardous processing area around the unit 1000. The information provided by the controller 1050 allows monitoring of the amount of DSA 600 dispensed into the exhaust gas stream 1060, the inventory of the DSA 600 within the down stream addition system 1010, events and the like.

In the embodiment depicted in FIG. 9, the exhaust gas stream 1060 exits the regenerator 1002 of the fluidized unit 100 (e.g., the regenerator of an FCC unit) and passes through an optional heat recovery unit 1006, such as a CO boiler, prior to entering the third stage separator 1012 and electrostatic precipitator 1014. The down stream addition system 1010 is coupled by a feed line 1024 to the conduit 1004 at a location downstream of the heat recovery unit 1006 (if present) and prior to the third stage separator 1012. Alternatively, the feed line 1024 may couple to the conduit 1004 upstream of the heat recovery unit 1006 to increase residence time of the DSA 600 in the gaseous exhaust stream.

In an embodiment, the down stream addition system 1010 includes a vessel 1022 or device for dispensing DSA 600 into the conduit 1004 carrying the exhaust gas stream 1060. The down stream addition system 1010 may continuously dispense DSA 600 (or other particulate matter) into the conduit 1004 or dispense DSA 600 into the conduit 1004 in discrete amounts. Additions from the down stream addition system 1010 may be made in metered (e.g., measured) amounts to track the amount of DSA 600 being interfaced with the exhaust gas stream 1060 using the controller 1050. In one embodiment, catalyst addition systems may be adapted to operate as down stream addition systems 1010. Non-limiting examples of catalyst addition systems that may be adapted to operate as down stream addition systems 1010 include, but are not limited to, systems described in U.S. patent application Ser. No. 11/283,227, filed Nov. 18, 2005, U.S. patent application Ser. No. 10/374,450, filed Feb. 26, 2003, U.S. patent application Ser. No. 10/445,453, filed May 27, 2003, U.S. patent application Ser. No. 10/717,250, filed Nov. 19, 2003, U.S. patent application Ser. No. 11/008,913, filed Dec. 10, 2004, U.S. patent application Ser. No. 10/717,249, filed Nov. 19, 2003, and U.S. patent application Ser. No. 11/835,347, filed Aug. 7, 2007, all of which are incorporated by reference in their entireties. An eductor may also be adapted to function as part of a down stream addition system 1010 to add DSA 600, other additives, catalysts or other particulate matter to an exhaust gas stream 1060 of a fluidized unit as further described below. Non-limiting examples of eductors for use with fluidized units such as an FCC unit that may be adapted for use in a down stream addition system 1010 are described in U.S. patent application Ser. No. 11/462,882, filed Aug. 7, 2008.

Figure 10:
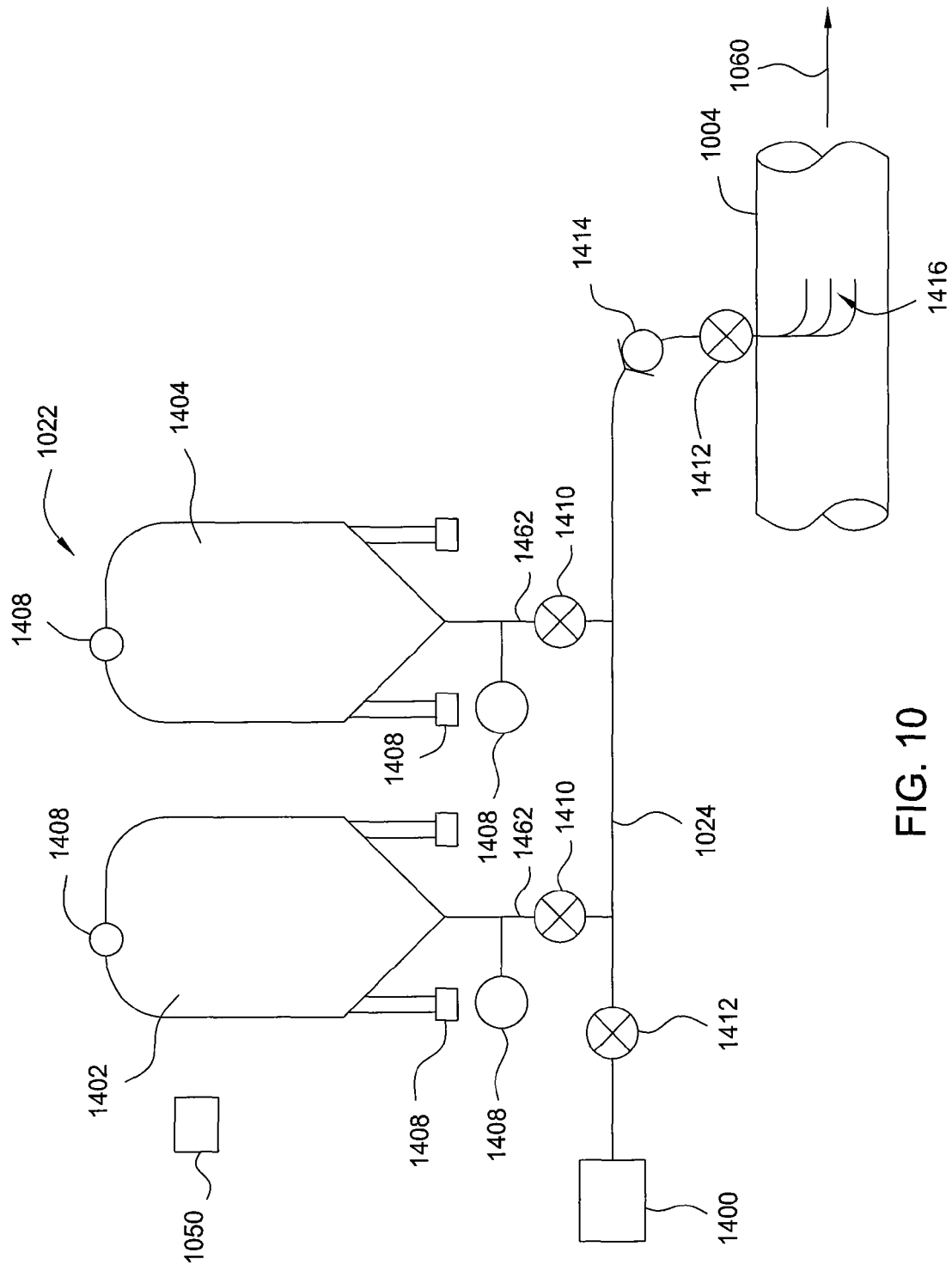
FIG. 10 is a schematic diagram of a vessel of the addition system of FIG. 9 in accordance with an alternative embodiment of the invention.

FIG. 10 depicts one embodiment of a vessel configured for providing DSA 600 to the feed line 1024. The vessel 1022 includes a first container 1402 and a second container 1404 coupled in parallel to the feed line 1024. Each container 1402, 1404 includes one or more sensors 1408 and a metering device 1410 which communicate with the controller 1050, such that the DSA 600 provided from the vessel 1022 into the gas stream in the conduit 1004 may be precisely measured and historically tracked on a real time basis. The sensors 1408 may be one or more of a level sensor located to detect changes in the level of DSA 600 within the containers 1402, 1404 that are indicative of the amount of DSA 600 provided to the conduit 1004; load cells interfaced with the container 1402, 1404 to determine the weight gained or lost due to DSA 600 additions for removal from the container 1402, 1404; and/or a flow meter positioned to determine the amount of material leaving the container 1402, 1404 and entering the feed line 1024 through the metering device 1410. The metering device 1410 may be a valve or positive displacement device which can operably be utilized to provide discrete amounts of DSA 600 into a delivery line 1462 coupled to the feed line 1024, or alternatively, control the rate and/or amount of material exiting the container 1402, 1404 and entering the feed line 1024 from the delivery line 1462 in a batch or continuous basis, such that the controller 1050 may control and keep track of the amount of DSA 600 dispensed into the conduit 1004 through an outlet 1416 of the feed line 1024 using information provided by the sensors 1408.

The feed line 1024 is coupled to a fluid source 1400, such as plant air or a blower, which moves DSA 600 exiting the containers 1402, 1404 through a check valve 1414 and into the conduit 1004. Shut-off valves 1412 may be provided in order to isolate the feed line 1024 from the conduit 1004 when desired. To enhance distribution of DSA 600 within the conduit 1004, the outlet 1416 of the feed line 1024 may include a quill or a plurality of outlet pipes or a quill comprising a plurality of outlet holes to enhance mixing and distribution of the DSA 600 in the exhaust gas stream 1060.

In an embodiment, DSA 600 is provided to the feed line 1024 through operation of the metering device 1410 of at least one of the containers 1402, 1404. In a mode providing a continuous addition of DSA 600 to the exhaust gas stream 1060, the metering device 1410 coupled to the container 1402 is operated to allow a continuous stream of DSA 600 to enter the conduit 1004 in a regulated manner while the sensors 1408 interfaced with the container 1402 provide a metric indicative of the amount of DSA 600 entering the exhaust stream to the controller 1050, which records the rate and/or amount of DSA 600 being added and updates the inventory of DSA 600 in the down stream addition system 1010. Depending on the DSA 600 needs within the exhaust stream, the controller 1050 may control the operation of the metering device 1410 to add more or less DSA 600, for example, in response to a metric provided by the sensor 1030 described above. Once the amount of DSA 600 within the container 1402 reaches a predefined amount, the metering device 1410 coupled to the container 1402 is closed, and the metering device 1410 coupled to the container 1404 is opened to provide a substantially uninterrupted stream of DSA 600 to the conduit 1004 while the container 1402 is refilled with additional DSA 600. Once the DSA 600 within the container 1404 reaches a predefined level, the metering device 1410 coupled to the container 1404 is closed, and the metering device 1410 coupled to the container 1402 is opened to provide a substantially uninterrupted flow of DSA 600 to the exhaust stream.

In another embodiment, DSA 600 is provided intermittently in batches. For example, the metering device 1410 coupled to the container 1402 is operated to open and close at intervals, thereby providing batches of DSA 600 to enter the conduit 1004. The sensors 1408 interfaced with the container 1402 provide a metric indicative of the amount of each batch of DSA 600 entering the exhaust stream to the controller 1050, which records the total of DSA 600 being added and updates the DSA 600 inventory of the down stream addition system 1010. In an embodiment, the down stream addition system 1010 provides the DSA 600 in less than 5 minute intervals between batches, less than 3 minute intervals between batches, less than 2 minute intervals between batches, or less than 1 minute intervals between batches. Once the amount of DSA 600 within the container 1402 reaches a predefined amount, batches of DSA 600 are then provided from the container 1404 are provided to the conduit 1004 to provide a substantially uninterrupted stream of DSA batches to the conduit 1004 while the container 1402 is refilled with additional DSA 600.

Figure 11:
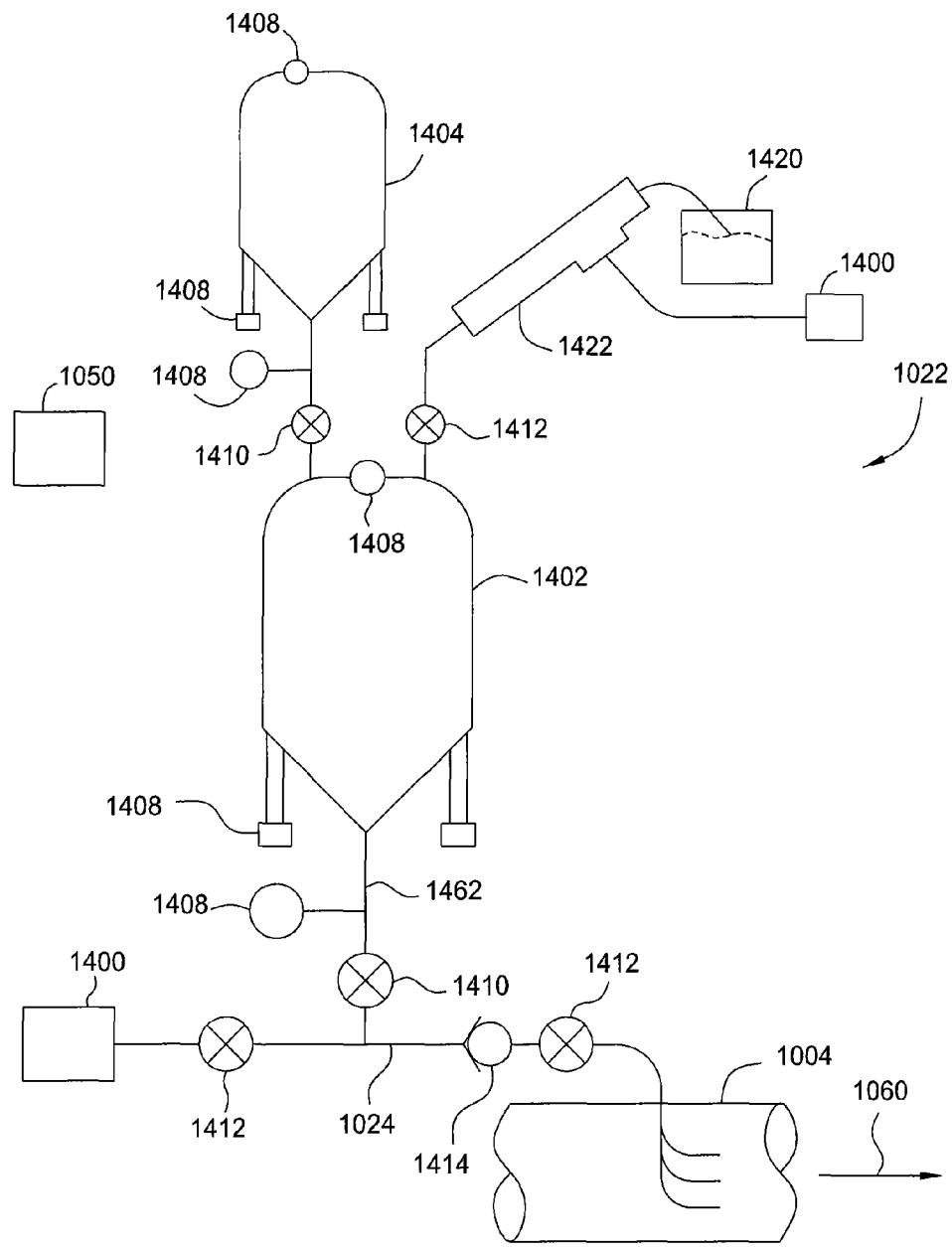
FIG. 11 is a schematic diagram of a vessel of the addition system of FIG. 9 in accordance with an alternative embodiment of the invention.

FIG. 11 depicts another embodiment of the vessel 1022. The vessel 1022 includes a container 1402 configured as described with reference to FIG. 10. As such, the container 1460 is a metering device 1410 which regulates DSA 600 dispensed from the container 1460 into the delivery line 1462 and feed line 1024, which eventually provides the DSA 600 to the conduit 1004. However, when the amount of DSA 600 in the container 1402 reaches a predefined level, a predefined amount of DSA 600 is provided to the container 1402 so that the calculations of DSA 600 provided to the exhaust stream flowing through the conduit 1004 can be accurately maintained. In one embodiment, the container 1402 is recharged by a feed system from the container 1404, which may be configured as a feed addition system similar to that described with reference to FIG. 10. Alternatively, the container 1402 may be recharged with DSA 600 using an eductor 1422 or other device which may empty the entire contents of a tote 1420 or other container having a known quantity of DSA 600 which can be provided to the controller 1050 to update or maintain the accuracy of the amount of DSA 600 within the container 1402 and ultimately provided to the exhaust stream flowing in the conduit 1004. In this manner the feed system replenishes the vessel 1022 such that uninterrupted additions may be made.

Figure 12:
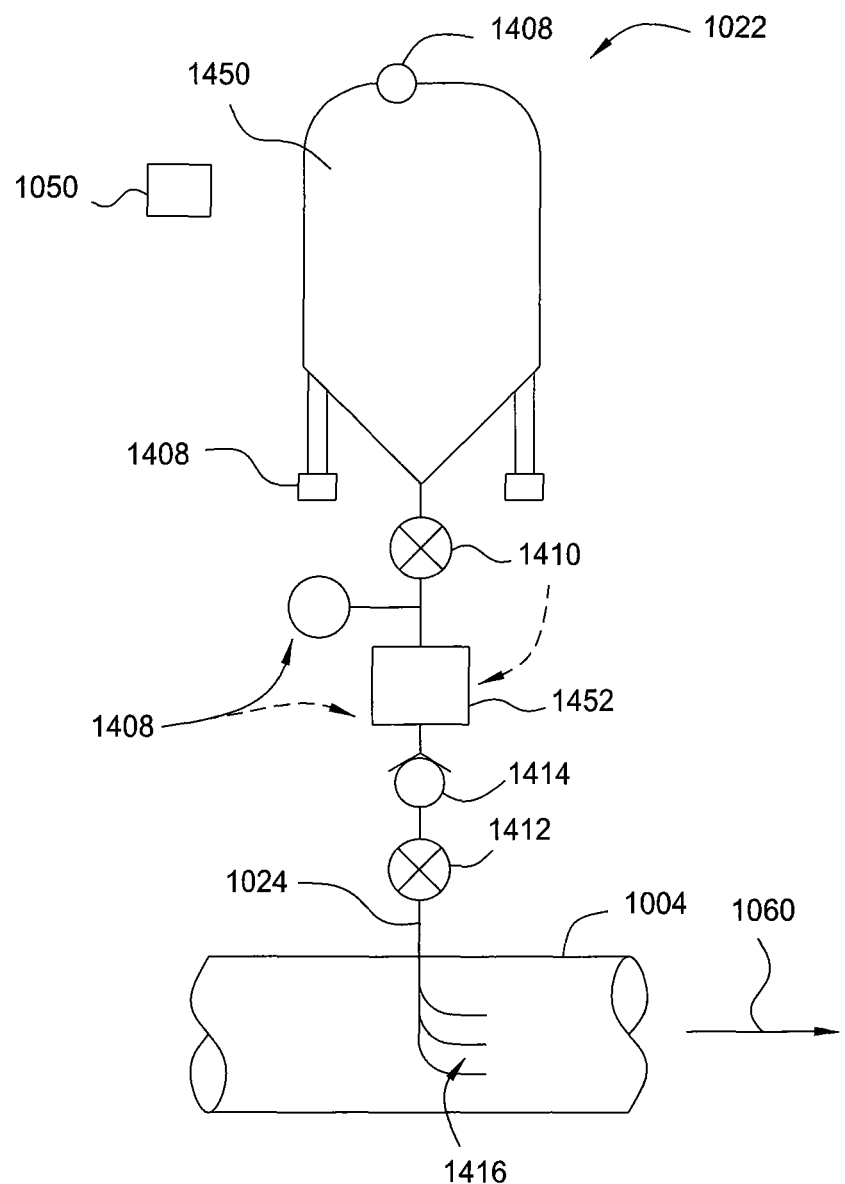
FIG. 12 is a schematic diagram of a vessel of the addition system of FIG. 9 in accordance with an alternative embodiment of the invention.

FIG. 12 depicts another embodiment of a vessel 1022 suitable for providing DSA 600 in various forms such as liquid, solutions, dispersions of solids, slurries, and the like, either individually or combinations of two or more thereof. The vessel 1022 depicted in FIG. 12 includes a container 1450 which is suitable for containing a quantity of fluid and/or slurry. The container 1450 is interfaced with at least one sensor 1408 and a metering device 1410 as described above. In one embodiment, the at least one sensor 1408 and metering device 1410 may be integrated as a positive displacement device 1452 which controls and/or meters the amount of liquid and/or slurry and the like contained in the container 1450 and introduced into the exhaust gas stream 1060 flowing through the conduit 1004.

Figure 13:
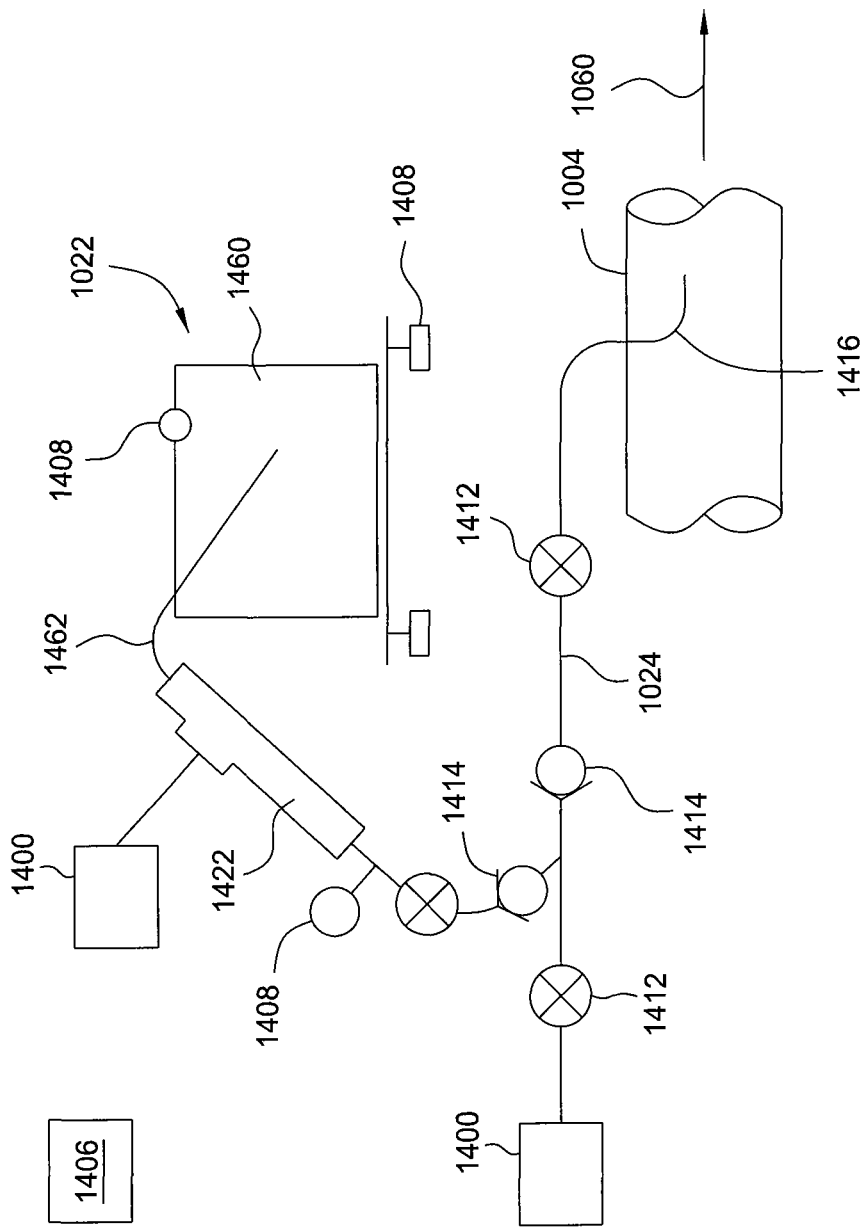
FIG. 13 is a schematic diagram of a vessel of the addition system of FIG. 9 in accordance with an alternative embodiment of the invention.

FIG. 13 depicts another embodiment of a vessel 1022 suitable for providing DSA 600 in various forms such as liquid, solutions, dispersions of solids, slurries and the like, either individually or combinations of two or more thereof. The vessel 1022 depicted in FIG. 13 includes a container 1460 which is suitable for containing a quantity of DSA 600 in the form of a fluid, slurry and/or powder. The container 1460 may be a tote or other suitable container. Sensors 1408 are interfaced with the container 1460 and/or delivery line 1462 coupling the container 1460 to the feed line 1024. The container 1460 is also interfaced with a metering device 1410 as described above. At least one eductor 1422 is interfaced with the delivery line 1462 to move DSA 600 from the container 1460 to the feed line 1024 and eventually to the conduit 1004. In one embodiment, metering device 1410 and eductor 1422 may be an integrated unit. The eductor 1422 is useful for moving particles of DSA 600 having smaller size dimensions, for example DSA 600 having an average particle size ranging down to about 30 μm. Thus, the eductor 1422 and metering device 1410 cooperate with container 1460 to function as the down stream addition system 1010.

Returning to FIG. 9, the length of a region of the conduit 1004 bounded by the feed line 1024 and the third stage separator 1012 defines a reaction zone 1008 in which DSA 600 or other particulate matter such as but not limited to one or more DSA 600 or catalyst, either individually or in combination of two or more thereof, provided by the down stream addition system 1010 may interface with and react with the gases and other material entrained in the exhaust gas stream 1060. Some non-limiting examples of one or more considerations for the design of the reaction zone 1008 include the length and diameter of the conduit 1004 defining the reaction zone 1008, and the reaction time required for the DSA 600. Generally, a short reaction zone 1008 means less residence time for the DSA 600, and where space permits, the reaction zone 1008 may be long enough to provide adequate reaction time. Optionally, the DSA 600 may be recycled, and if the DSA 600 is recycled back to the regenerator 1002; the reaction zone or zones include the reaction zone 202 of the regenerator 1002 wherein the recycled DSA 600 may interact with the surrounding matter. In one embodiment, the reaction zone 1008 defined in the conduit 1004 is designed to minimize the use of DSA 600 such that the capacity of the third stage separator 1012 and/or electrostatic precipitator 1014 does not reach a saturation point due to excess addition of DSA 600. It is contemplated that the reaction zone or multiple reaction zones 202, 1008 may be in the regenerator 1002 and/or conduit 1004 of the same or multiple fluidized units 1000. For example, the down stream addition system 1010 may be configured to provide DSA 600 to reaction zones 202, 1008 in two or more different fluidized units 1000, wherein the different units share the same exhaust gas stream 1060 treated by the down stream addition system 1010. It is also contemplated that the down stream addition system 1010 may be configured to provide DSA 600 to reaction zones 202, 1008 in two or more different fluidized units 1000, wherein at least two of the different units 1000 do not share the same exhaust gas stream 1060 treated by the down stream addition system 1010. One addition system that provides catalyst to multiple units that may be adapted to provide DSA 600 to multiple reaction zones 202, 1008 is described in U.S. patent application Ser. No. 12/504,882, filed Jul. 17, 2009, which is incorporated by reference in its entirety.

At the end of the reaction zone 1008, the third stage separator 1012 removes particulate matter, including DSA 600, from the exhaust gas stream 1060. Generally, the third stage separator 1012 removes both coarse and fine particles from the exhaust gas stream 1060. Coarse particles are generally particles having an average diameter in a range from about 70 μm to about 80 μm, while fine particles are generally defined as having an average diameter in a range from about 20 μm to about 40 μm. The particulate removed from the third stage separator 1012 may be discarded or recycled. In one embodiment, the particulate matter separated by the third stage separator may be recycled back into the generator of the fluidized unit 1000, to the vessel 1022 and/or recycled for use in one or more other fluidized units 1000, including those which do not share a common exhaust gas stream 1060. A recycling path between the third stage separator 1012 and the unit 1000 is designated by reference numeral 1018. As discussed above, recycled DSA 600 routed along the recycling path 1018 has been exposed to the exhaust gas stream 1060 and is not to be confused with virgin DSA 600.

Recycling DSA 600 primarily recovered from the third stage precipitator has a number of advantages. For example, as super-fines present in the exhaust gas stream have a diameter of less than about 20 μm, the relatively larger particle size of recycled DSA 600 allows recycled DSA 600 to be removed and recycled separately from the super-fine. Thus, the recycled DSA 600 is more easily handled, and the concentration of active materials on the recycled DSA 600 is more concentrated due to the lack of super-fine particles.

The exhaust gas stream 1060 leaving the third stage separator 1012 passes through the electrostatic precipitator 1014 prior to entering the flue gas stack 1016. The electrostatic precipitator 1014 removes not only coarse and fine particles which may still be entrained in the exhaust gas stream 1060, but also removes super-fine particles. Super-fine particles are particles having an average diameter less than about 20 μm. The electrostatic precipitator 1014 may include multiple stages to preferentially separate particles of different size ranges in different stages, as further discussed below. The particles removed from the electrostatic precipitator 1014 may include virgin DSA 600 provided by the down stream addition system which has traveled through the conduit 1004 for the first time. The particles removed by the electrostatic precipitator 1014 may be recycled with or separated from particles captured by the third stage separator 1012. Thus, particles removed from the exhaust gas stream 1060 by the electrostatic precipitator 1014 may be recycled back into the regenerator 1002 of the fluidized unit 1000, to the vessel 1022 and/or recycled for use in one or more other fluidized units, including those which do not share a common exhaust gas stream 1060. A recycling path between the electrostatic precipitator 1014 and the unit 1000 is designated by reference numeral 1020. As discussed above, recycled DSA 600 routed along the recycling path 1020 has been exposed to the exhaust gas stream 1060 and is not to be confused with virgin DSA 600.

It is also contemplated that the particles removed from the exhaust gas stream 1060 and residing on the collection plates of the electrostatic precipitator 1014 form a dust cake comprising CEM 300 and/or DSA 600. The frequency of rapping to remove the dust cake may be adjusted to increase the amount of CEM 300 and/or DSA 600 exposed to the exhaust gas stream 1060 by the dust cake, thereby increasing the amount of emissions removed from the exhaust gas stream 1060 without adding additional CEM 300 or DSA 600.

The exhaust gas stream 1060 leaving the electrostatic precipitator 1014 passes through one or more filtration devices 1032, if present, prior to entering the flue gas stack 1016. The one or more filtration devices 1032 may be positioned at other locations on conduit 1004 relative to the locations of the electrostatic precipitator 1014 and/or the third stage separator 1012. The filtration devices 1032 includes a plurality of filters 1036 disposed in a housing 1038. The exhaust gas stream 1060 flows from the conduit 1004 into an inlet port of the housing 1038, through the filters 1036, and then exits the housing 1038 through an outlet port. The outlet port of the housing 1038 is coupled to the conduit 1004 to the exhaust flue 1006.

The filters 1036 may be a bag filter, pleated filter, ceramic filter, sintered metal filter or other filter suitable for filtering the exhaust gas stream 1060. The filters 1036 remove PM from in the exhaust gas stream 1060, which forms a dust cake of PM on the on the upstream surface of the filter 1036. The dust cake comprises virgin DSA 600, recycled DSA 600, virgin CEM 300, and recycled CEM 300 present in the PM filtered from the exhaust gas stream 1060. The dust cake is periodically removed from the upstream surface of the filter 1036 by forcing a reverse jet of air through the filter 1036 and/or by shaking the filter 1036 and/or the housing 1038. The dust cake removed from the filter 1036 is collected in the housing 1038 or a bin (not shown) connected thereto.

The PM of dust cake removed from the filter 1036 collected in the housing 1038 (which includes any virgin DSA 600, recycled DSA 600, virgin CEM 300, and recycled CEM 300 present in the exhaust gas stream 1060), may be recycled back into the regenerator 1002 of the fluidized unit 1000, to the vessel 1022 and/or recycled for use in one or more other fluidized units, including those which do not share a common exhaust gas stream 1060. A recycling path between the electrostatic precipitator 1014 and the unit 1000 is designated by reference numeral 1034. As discussed above, recycled DSA 600 and/or recycled CEM 300 present in the dust cake routed along the recycling path 1034 has been exposed to the exhaust gas stream 1060, and is not to be confused with virgin DSA 600 and/or virgin CEM 300.

The dust cake present on the filter 1036 provides a bed of absorption media comprising DSA 600 and/or CEM 300 through which the exhaust gas stream 1060 must pass through prior to entering the flue gas stack 1016. Thus, the bed of absorption media present on the filter 1036 provides another reaction zone through which the exhaust gas stream 1060 must pass, resulting in a significant increase of amount of $SO_x$ and/or $NO_x$ removed from the exhaust gas stream 1060. For example, test data demonstrates that the use of a filtration device 1032 to retain a dust cake of DSA 600 through which the exhaust gas stream 1060 was forced to flow through resulted in a 40 percent drop in $SO_x$ emissions relative to an exhaust gas stream untreated with DSA 600. This relates to an 80 percent reduction on the treated exhaust gas stream 1060.

In embodiments wherein the particulate matter withdrawn from the third stage separator 1012, electrostatic precipitator 1014 and/or filtration device 1032 is recycled to the regenerator 1002 of an FCC unit, the flow of recycled DSA 600 may be described as counter-current. For example, virgin DSA 600 is first used in the flue gas exhaust gas stream 1060 within the conduit 1004 when the DSA 600 is freshest (i.e., most reactive), then recycled into the regenerator 1002 of the unit 1000 for a second use. Thus, the sequence of use of the recycled DSA 600 is counter-current to the direction of the exhaust gas flow leaving the regenerator 1002 toward the flue stack 1016.

Figure 14:
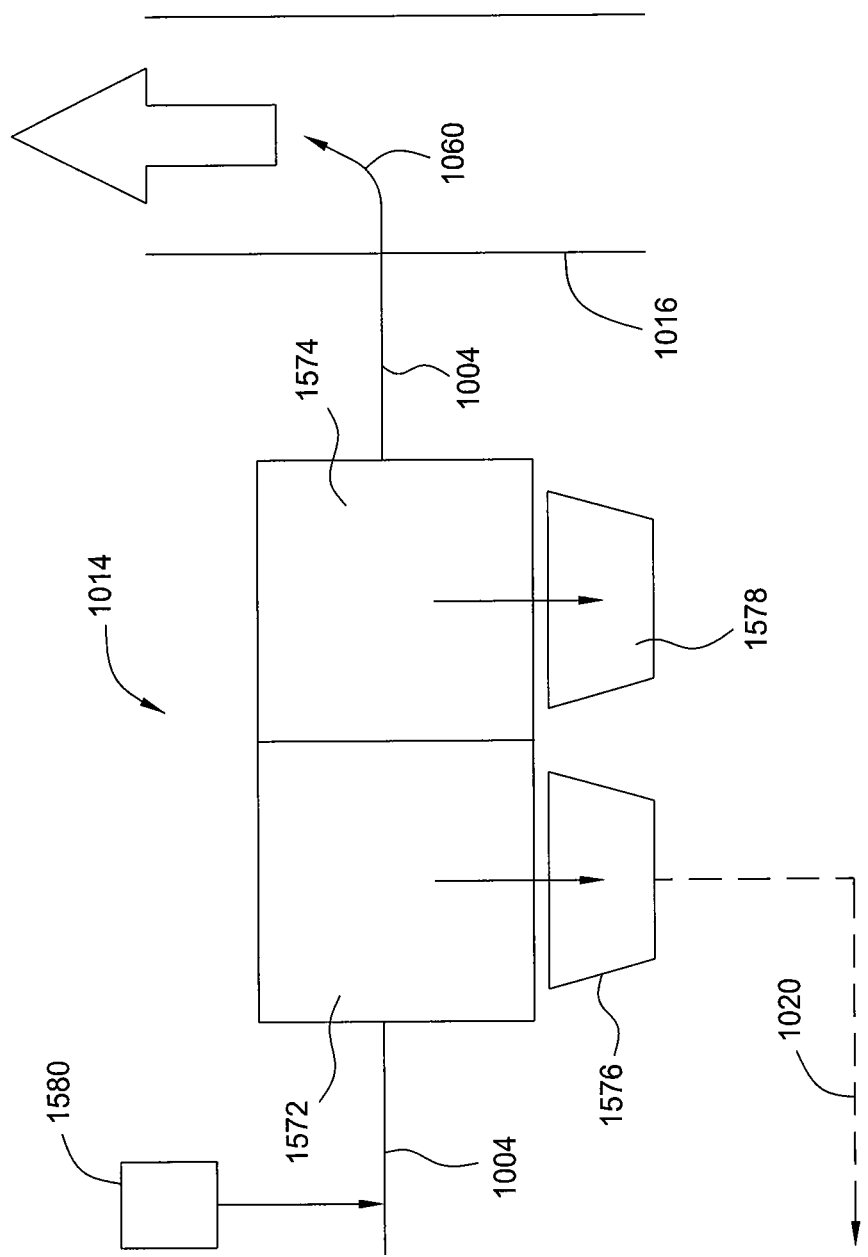
FIG. 14 is a schematic diagram of one embodiment of an electrostatic precipitator in accordance an embodiment of the invention.

FIG. 14 depicts one embodiment of an electrostatic precipitator 1014 which may be utilized for removing DSA 600 from the gaseous exhaust stream passing through the conduit 1004 into the flue gas stack 1016. The electrostatic precipitator 1014 includes at least two stages, illustratively shown as a first stage 1572 and a second stage 1574. The first stage 1572 generally removes coarser particles from the gaseous exhaust stream and deposits the separated material into a bin 1576. The second stage 1574 of the electrostatic precipitator 1014 removes finer particles from the exhaust gas stream 1060 passing through the electrostatic precipitator 1014 which are not removed by the first stage 1572. Particles removed from the second stage 1574 are deposited in a second bin 1578.

Since the two stages 1572, 1574 remove different size ranges of particles, the electrostatic precipitator 1014 may be utilized to remove DSA 600 preferentially to catalysts by configuring the size of the DSA 600 entering the electrostatic precipitator 1014 to be in a different size range relative to catalyst, fines and other particulate matter so that the DSA 600 may be removed in a separate stage 1572, 1574 and collected in separate bins 1576, 1578. By collecting the DSA 600 preferentially in one of the bins 1576, 1578, the collected DSA 600 removed from the exhaust gas stream 1060 is not diluted by catalyst or other material, and the DSA 600 may be more readily recycled back through the regenerator 1002 of the fluidized unit 1000 without an adverse effect on the calculation or tracking of virgin DSA 600 placed into the exhaust gas stream 1060 traveling through the conduit 1004 and into the flue gas stack 1016 by the vessel 1022.

In one embodiment, the size of the DSA 600 present in the exhaust gas stream 1060 is in the size range from about 60 μm to about 300 μm in average diameter. Since the catalyst and catalyst fines present in the exhaust gas stream 1060 are typically much smaller than the dimension of the DSA 600, for example, typically having an average diameter in the size range less than about 10 μm to about 15 μm, the DSA 600 is preferentially removed from the exhaust stream in the first stage 1572 while the catalyst fines are removed in the second stage 1574. Thus, the DSA 600 from the bin 1576 may be recycled as shown by path 1020 back to the regenerator 1002 of the fluidized unit 1000 for further use without excessive dilution by non-DSA material. Alternatively, the DSA 600 from the bin 1576 may be recycled back to the vessel 1022 (or other addition system) for reintroduction into the gaseous exhaust stream passing through the conduit 1004. CEM 300 may be similarly recycled to either the regenerator 1002 of the fluidized unit 1000 for further use and/or recycled for reintroduction into gaseous exhaust stream 1060 passing through the conduit 1004.

It is also contemplated that DSA 600 may have a high attrition index (ASTM D5757-10), which promotes the breaking of DSA 600 in the exhaust gas stream 1060 present in the conduit 1004, thereby reducing the size of the DSA 600 while in the gaseous exhaust stream due to collision with the walls of the conduit 1004 and other DSA 600. The high attrition index allows the particle size of virgin DSA 600 to be large enough for ease of handling prior to entry into the effluent gas stream 1060, while once added to the effluent gas stream 1060 fractures and breaks into smaller particles of DSA 600, thereby increasing the particle surface area and making more active material available for $NO_x$ and/or $SO_x$ reduction. In order to preferentially capture the particles of DSA 600 in the first stage 1572 of the electrostatic precipitator 1014 relative to other fines, a clumping or aggregation agent may be introduced into the conduit 1004 upstream of the first stage 1572 by a promoter source 1580. The DSA 600 may additionally or alternatively include a clumping encouragement component 606. The promoter source 1580 provides a material which enhances the propensity of the particles DSA 600 to clump or aggregate or increase in weight to make collection by the electrostatic precipitator 1014 more effective. For example, the promoter source 1580 may introduce water bearing a salt solution or other material which would increase the weight or propensity to clump or aggregate by the particles of DSA 600. Increasing the weight of particles of DSA 600 makes removal of DSA 600 by the third stage separator 1012 more effective. Clumping and aggregation of particles of DSA 600 increases the particle diameter, which makes the clumped particles of DSA 600 more likely to be separated in the first stage 1572, as compared to the catalyst fines removed in the second stage 1574. This technique may also be utilize prior to the third stage separator 1012 to promote clumping, aggregation or increase in weight to make collection by the electrostatic precipitator 1014 more effective.

In another embodiment, the first stage 1572 of the electrostatic precipitator 1014 may include a magnetic field generator. The magnetic field generator interfaced with the first stage 1572 removes DSA 600 which have been modified to be or inherently are more magnetic than conventional catalyst and additive fines. This enables the DSA 600 to be preferentially removed in the first stage 1572 relative to the catalyst fines removed in the second stage 1574.

Figure 15:
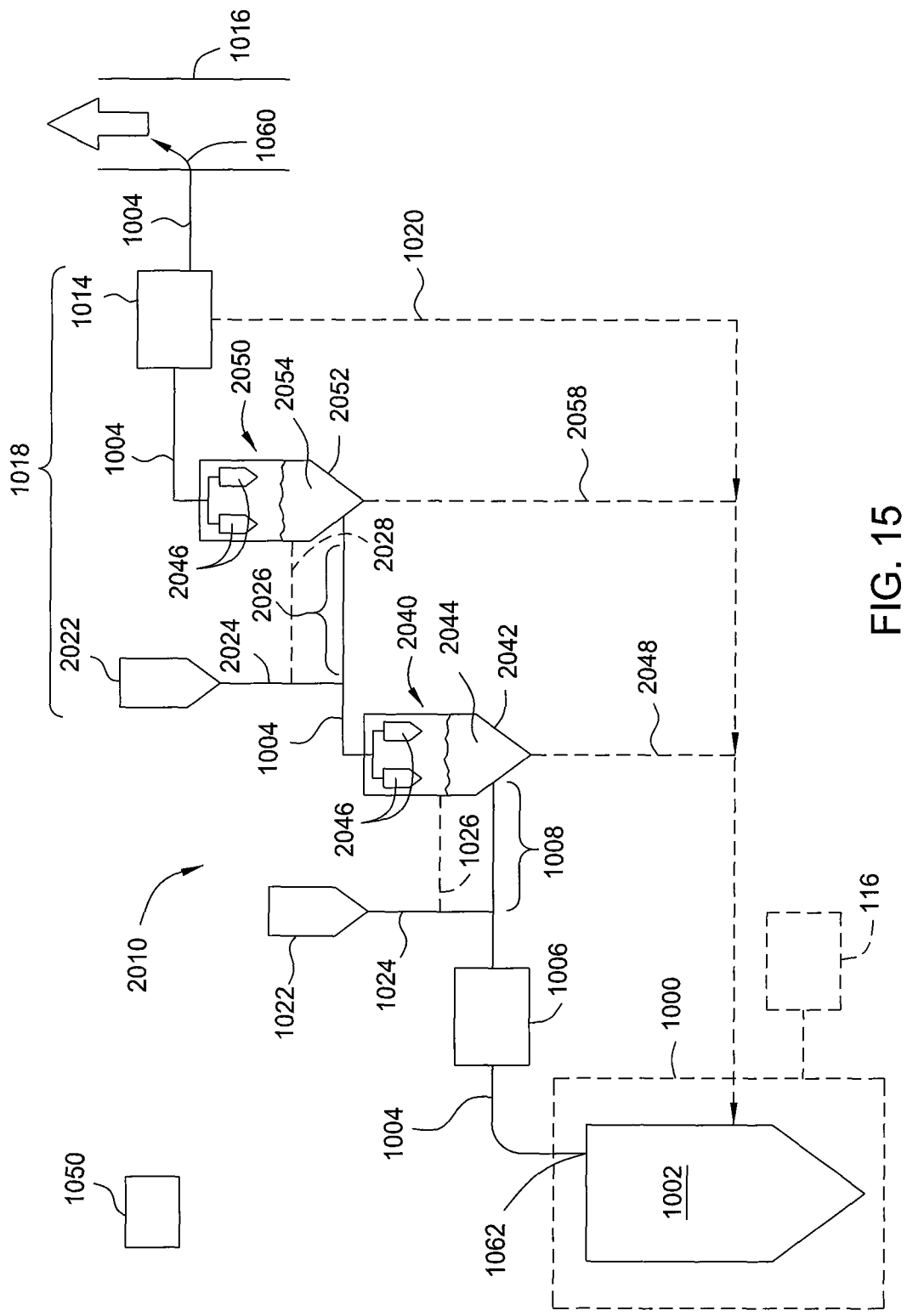
FIG. 15 is a down stream addition system integrated in a flue gas exhaust gas stream in accordance an embodiment of the invention.

FIG. 15 is another embodiment of a down stream addition system 2010 coupled to an exhaust gas stream 1060 of a fluidized unit 1000. In the embodiment depicted in FIG. 15, the addition system 2010 is generally configured similarly to the down stream addition system 1010 described above with reference to FIG. 9, except that at least one circulating fluid bed vessel 2040 is disposed in-line with conduit 1004 directing the exhaust gas stream 1060 between the fluidized unit 1000 and the electrostatic precipitator 1014. The circulating fluid bed vessel 2040 includes a housing 2042 that retains a bed of DSA 600 (i.e., a DSA bed 2044) therein. The DSA bed 2044 provides a reaction zone for the DSA 600 to react with the exhaust gas stream 1060. The housing 2042 may incorporate one or more third stage separators 2046, such as cyclonic separators, within a plenum defined in the housing 2042 above the DSA bed 2044. Alternatively or in addition, a separate third stage separator (such as the separator 1012 shown in FIG. 9) may be disposed between the circulating fluid bed vessel 2040 and the electrostatic precipitator 1014. DSA 600 may be provided to the circulating fluid bed vessel 2040 either directly from the vessel 1022 of the addition system 2010 via a feed line 1026 (shown in phantom) or via feed line 1024 which entrains the DSA 600 with the exhaust gas stream 1060 entering the circulating fluid bed vessel 2040 through the conduit 1004.

In the embodiment depicted in FIG. 15, two circulating fluid bed vessels 2040, 2050, each containing integrated third stage separators 2046, are disposed in series prior to the electrostatic precipitator 1014. The particle matter exiting the bed of the circulating fluid bed vessel may be discarded or recycled. If two circulating fluid bed vessels 2040, 2050 are used, each circulating fluid bed vessel 2040, 2050 may be used for the addition of different DSA 600 to prevent intermixing of the DSAs. For example, a bed 2044 of $SO_x$ DSA may be used in the upstream circulating fluid bed vessel 2040, while a bed 2054 of $NO_x$ DSA may be disposed in a housing 2052 of the downstream circulating fluid bed vessel 2050. Thus, intermixing in the reaction zone is minimized. Moreover, the recycle streams 2048, 2058 may optionally be kept separate, if desired. For example, recycled $NO_x$ DSA may be kept from entering the regenerator 1002 while the $SO_x$ DSA is recycled through the regenerator 1002 by routing the recycle path 2058 to a holding bin instead of to the regenerator 1002.

Utilization of a circulating fluid bed vessel advantageously increases the residence time of the DSA 600 in the exhaust gas stream 1060 without the need to continuously add DSA 600 to the exhaust gas stream 1060. For example, the bed of DSA 600 may include about 20 percent DSA 600 as opposed to about 1 to about 3 percent DSA 600 present in the reaction zone of the system described in FIG. 6. Other advantages of using a circulating fluid bed vessel include reduction in the amount of DSA 600 used by about one quarter, for example, from about 1000 pounds/day for continuously provided DSA 600 into the exhaust gas stream to about 100-250 pounds/day of DSA 600 utilized in a circulating fluid bed vessel. Use of a circulating fluid bed vessel also minimize waste, enhances the ability to recycle DSA 600, increases the efficiency of DSA usage, prevents saturation of the electrostatic precipitator, and reduces the requirements (frequency) of additions and withdrawals, which extends equipment life and maintenance requirements.

Figure 16:
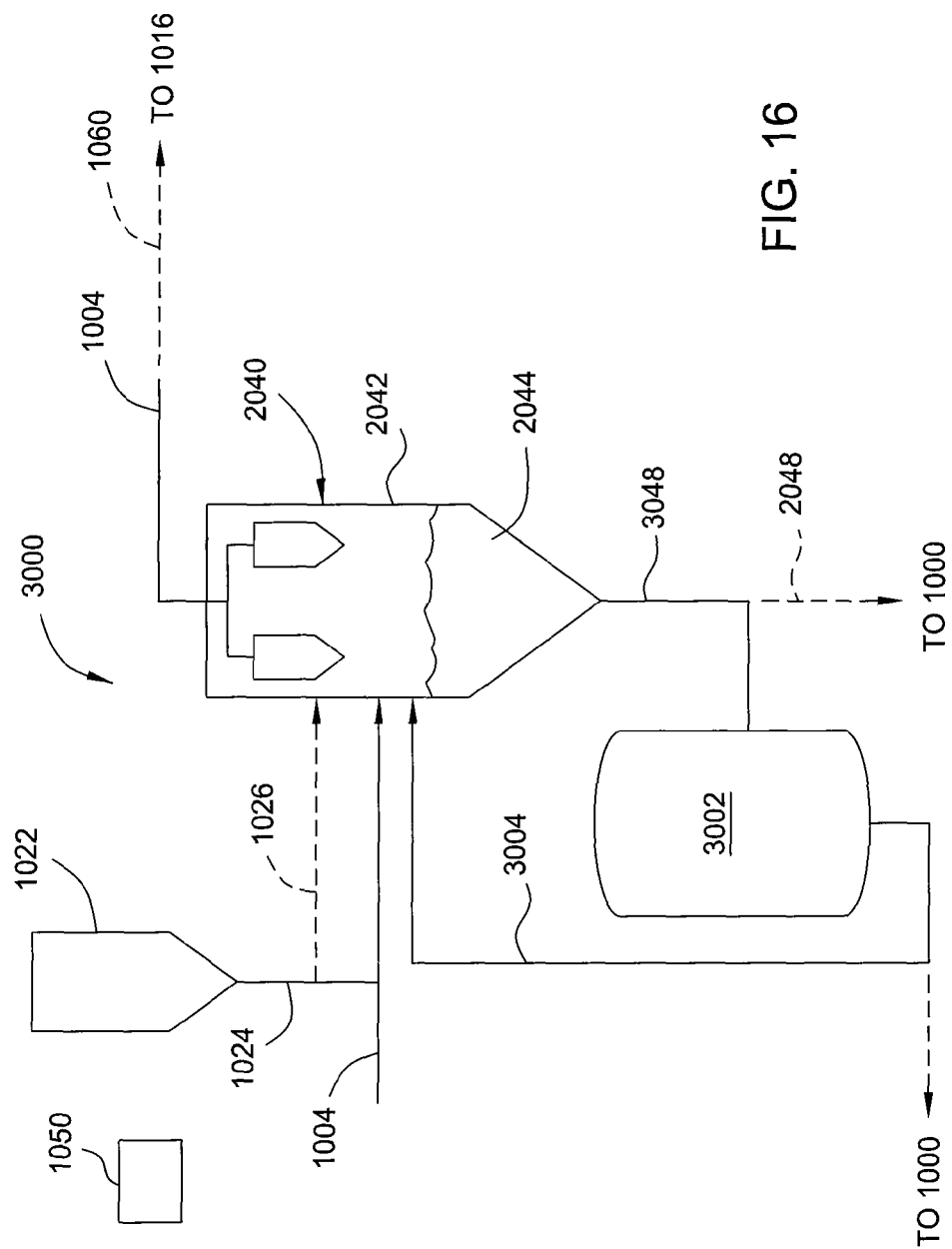
FIG. 16 is a circulating fluid bed separator with a dedicated regenerator which may be utilized in a down stream addition system in accordance an embodiment of the invention.

FIG. 16 is a schematic of another embodiment of a down stream addition system 3000. The down stream addition system 3000 includes a circulating fluid bed vessel 2040 having a dedicated regenerator 3002. The addition systems described above may also utilize a dedicated regenerator 3002 as described below. The circulating fluid bed vessel 2040 may optionally include one or more third stage separators 2046, such as cyclone separators disposed in the plenum above the DSA bed 2044. The particle removal port positioned at the bottom of the circulating fluid bed vessel 2040 is coupled by a feed line 3048 to an inlet port of the regenerator 3002 to allow DSA 600 exiting the circulating fluid bed vessel to be recycled through the regenerator. Valves and/or blowers, not shown, control the flow of material from the circulating fluid bed vessel to the regenerator 3002 to prevent blow-back. The DSA 600 from the circulating fluid bed vessel are regenerated in the regenerator 3002 and returned to the circulating fluid bed vessel for reuse via a return line 3004. Valves, not shown, control the flow of material from the regenerator 3002 to the circulating fluid bed vessel. It is also contemplated that any of the lines 3004, 3048 coupling the circulating fluid bed vessel and the regenerator 3002 may include a tee to enable a desired amount of DSA 600 to be diverted for other uses prior to, or after regeneration. Other uses for diverted DSA 600 include recycling the DSA 600 through a fluidized unit 1000, for example, a regenerator 1002 of an FCC unit to which the exhaust gas stream 1060 is directed though the circulating fluid bed vessel and/or one or more other fluidized units. The use of a dedicated regenerator 3002 enables more efficient use of the DSAs, and less frequent additions, thereby saving costs and extending the life of the vessel 1022 of the addition system.

Returning to FIG. 9, the performance of the electrostatic precipitator 1014 may be enhanced by selection of certain variables, either individually or combination of two or more thereof, to increase particle retention by the electrostatic precipitator 1014. Examples of such variables include, but are not limited to, modifying surface composition of the electrostatic precipitator, increasing the residence time in the electrostatic precipitator by increasing the size of the electrostatic precipitator or decreasing the gas velocity (for example, minimum residence time is about 3 seconds, typical is about 20 seconds, maximum residence time is about 30 seconds), increasing the power usage/voltage across the electrostatic precipitator, i.e., the voltage delta across the anode and cathode (for example, setting the voltage at a minimum of about 20,000V, such as about 40,000V, up to a maximum of about 50,000V), increasing the cleaning/rapping frequency of the electrostatic precipitator (for example, setting the rapping frequency at a minimum of about once every 10 minutes, such as about once per minute, to a maximum frequency of about once per every 10 seconds), and increasing the adhesion/retention (adhesion is ability to retain captured/absorbed PM while lower electrical resistivity of particle matter helps the electrostatic precipitator capture PM, among others). In yet other embodiments, a conditioning agent may be added to the flue gas exhaust stream prior to the electrostatic precipitator by a conditioning agent provider 1090. The conditioning agent may be a polar gas molecule which helps the electrostatic precipitator absorb/pick-up particle matter. Non-limiting examples of conditioning agents include $H_2O$, steam, $SO_3$, urea, salt solutions, $NO_R$, and $NH_3$. Thus, use of the conditioning agent results in an increased efficiency of the electrostatic precipitator that advantageously provides a reduction in the amount of particular matter exiting the stack to the atmosphere, while allowing more efficient reclamation of DSA 600 for recycling.

Figure 17A:
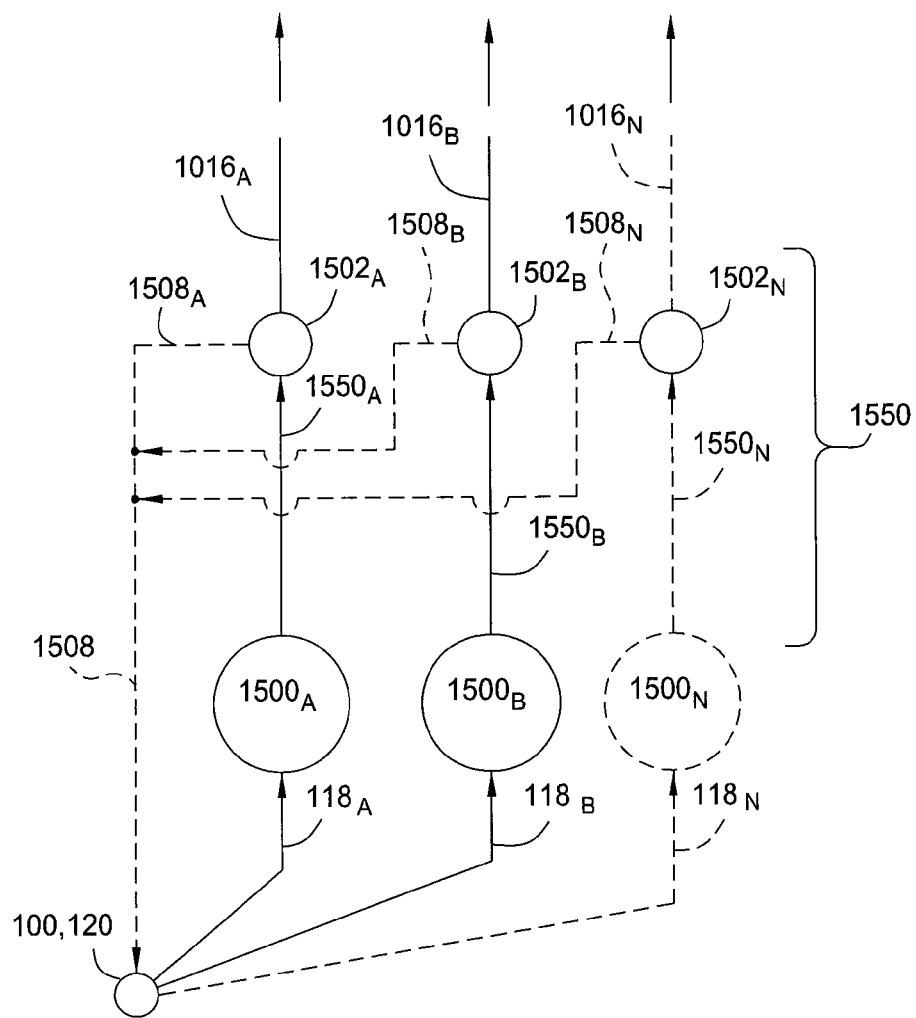
FIGS. 17A-17C are schematic diagrams of one or more addition systems interfaced with one or more units in accordance with alternative exemplary embodiments of the invention.
Figure 17B:
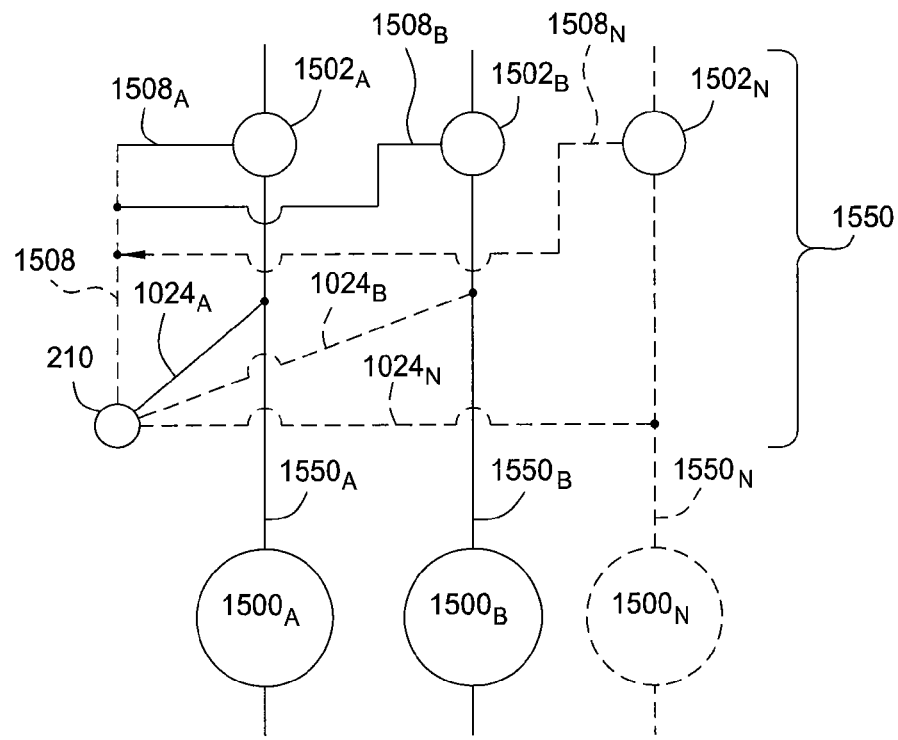
Figure 17C:
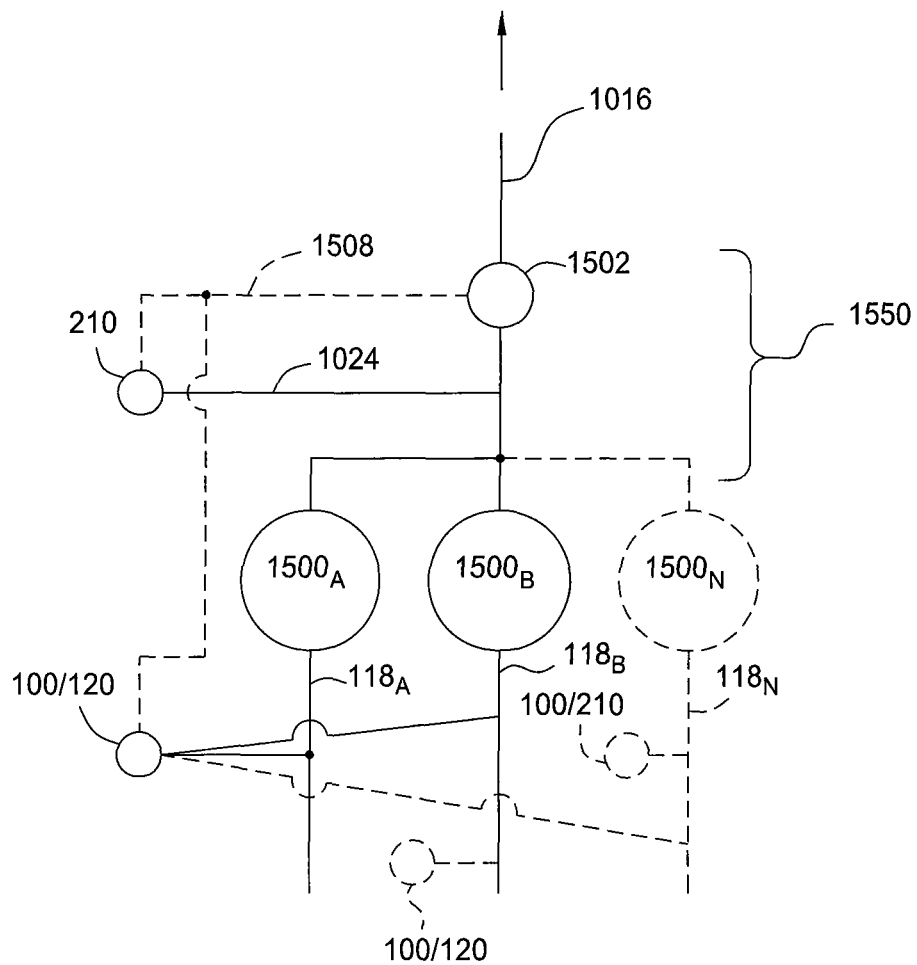

FIGS. 17A-17C are schematic diagrams for one or more addition systems interfaced with one or more units. In the embodiment of FIG. 17A, a plurality of units, shown as $1500_A$, $1500_B$, and $1500_N$, wherein N is representative of one or more additional units, are provided CEM 300 by at least one of an addition system 110, 120. The CEM 300 provided by the addition system 110, 120 is primarily virgin CEM 300; however, the addition systems 110, 120 may be utilized to provide recycled CEM 300. The addition system 110, 120 is coupled to the units $1500_A$, $1500_B$, and $1500_N$ by feed lines $118_A$, $118_B$, and $118_N$. The gaseous exhaust of each units $1500_A$, $1500_B$, and $1500_N$ travels via exhaust paths $1550_A$, $1550_B$, and $1550_N$ (collectively exhaust path 1550) through particle removal devices $1502_A$, $1502_B$, and $1502_N$ to a flue gas stack $1016_A$, $1016_B$, and $1016_N$. The particle removal devices $1502_A$, $1502_B$, and $1502_N$ (collectively particle removal devices 1502) may be one or more of any of the particle removal devices 1028 described above. A recycle line $1508_A$, $1508_B$, and $1508_N$ (1508 collectively) optionally couples each particle removal devices $1502_A$, $1502_B$, and $1502_N$ to the addition system 110, 120 which allows the virgin CEM 300 provided by the addition system 110, 120 to be recycled back (as recycled CEM 300) through one or more of the units $1500_A$, $1500_B$, and $1500_N$. The recycled CEM 300 may be alternatively added to units $1500_A$, $1500_B$, and $1500_N$ by a second addition system 120 (not shown) to segregate virgin and recycled CEM 300. In this manner, the addition system 110, 120 may be configured to service one or more of the units $1500_A$, $1500_B$, and $1500_N$ with virgin CEM 300, while the recycled CEM 300 may be collected from one or more of units $1500_A$, $1500_B$, and $1500_N$ for recycling to any one or more of the units $1500_A$, $1500_B$, and $1500_N$.

In the embodiment of FIG. 17B, a plurality of units, shown as $1500_A$, $1500_B$, and $1500_N$ are provided DSA 600 by an DSA addition system 210. The DSA 600 provided by the addition system 210 is primarily virgin DSA; however, the addition system 210 may also be utilized to provide recycled DSA. Although only one addition system 210 is shown in FIG. 17B, virgin and recycled DSA 600 may be provided by separate addition systems 210. The DSA addition system 210 is coupled to the units $1500_A$, $1500_B$, and $1500_N$ by feed lines $1024_A$, $1024_B$, and $1024_N$. The gaseous exhaust of each unit $1500_A$, $1500_B$, and $1500_N$ travels via exhaust paths $1550_A$, $1550_B$, and $1550_N$ (collectively exhaust path 1550) through particle removal devices $1502_A$, $1502_B$, and $1502_N$ to one or more exhaust flues (not shown). A recycle line $1508_A$, $1508_B$, and $1508_N$ (1508 collectively) optionally couples each particle removal devices $1502_A$, $1502_B$, and $1502_N$ to the DSA addition system 210 which allows the virgin DSA 600 provided by the DSA addition system 210 to be recycled back (as recycled DSA 600) through one or more of the exhaust paths $1550_A$, $1550_B$, and $1550_N$ of the units $1500_A$, $1500_B$, and $1500_N$. The recycled DSA 600 may be alternatively added to the exhaust path 1550 of the units $1500_A$, $1500_B$, and $1500_N$ by a second DSA addition system 210 (not shown) to segregate virgin and recycled DSA 600. In this manner, the DSA addition system 210 may be configured to service one or more of the units $1500_A$, $1500_B$, and $1500_N$ with virgin DSA 600, while the recycled DSA 600 may be collected from one or more of units $1500_A$, $1500_B$, and $1500_N$ for recycling to any one or more of the units $1500_A$, $1500_B$, and $1500_N$ without mixing the virgin and recycled DSA 600. In other embodiments, the virgin and recycled DSA 600 may be provided by a common DSA addition system 210.

In the embodiment of FIG. 17C, a plurality of units $1500_A$, $1500_B$, and $1500_N$ have a common exhaust path 1550 into which are provided DSA 600 by a DSA addition system 210. The DSA 600 provided by the addition system 210 is primarily virgin DSA; however, the addition system 210 may be utilized to provide recycled DSA. The gaseous exhaust of each units $1500_A$, $1500_B$, and $1500_N$ travels via exhaust paths 1550 through a common particle removal device 1502 to a flue gas stack 1016. Recycle line 1508 couples the particle removal device 1502 to the DSA addition system 210 which allows the virgin DSA 600 provided by the DSA addition system 210 to be recycled back through the exhaust path 1550 of the units $1500_A$, $1500_B$, and $1500_N$. The recycled DSA 600 may be alternatively added to the exhaust path 1550 of the units $1500_A$, $1500_B$, and $1500_N$ by a second addition system 210 (not shown) to segregate virgin and recycled DSA 600. The recycle line 1508 may additionally or alternatively couple the particle removal device 1502 to the CEM 300 addition system 110, 120 which allows the recycled DSA 600 to be recycled back through the units $1500_A$, $1500_B$, and $1500_N$. The recycled DSA 600 may be alternatively added by a second addition system 120 (not shown) to segregate virgin CEM 300 and recycled DSA 600. It is also contemplated that recycled CEM 300 removed by the particle removal device 1502 may be provided to at least one of the units $1500_A$, $1500_B$, and $1500_N$ and/or exhaust path 1550 in the same manner.

Figure 18A:
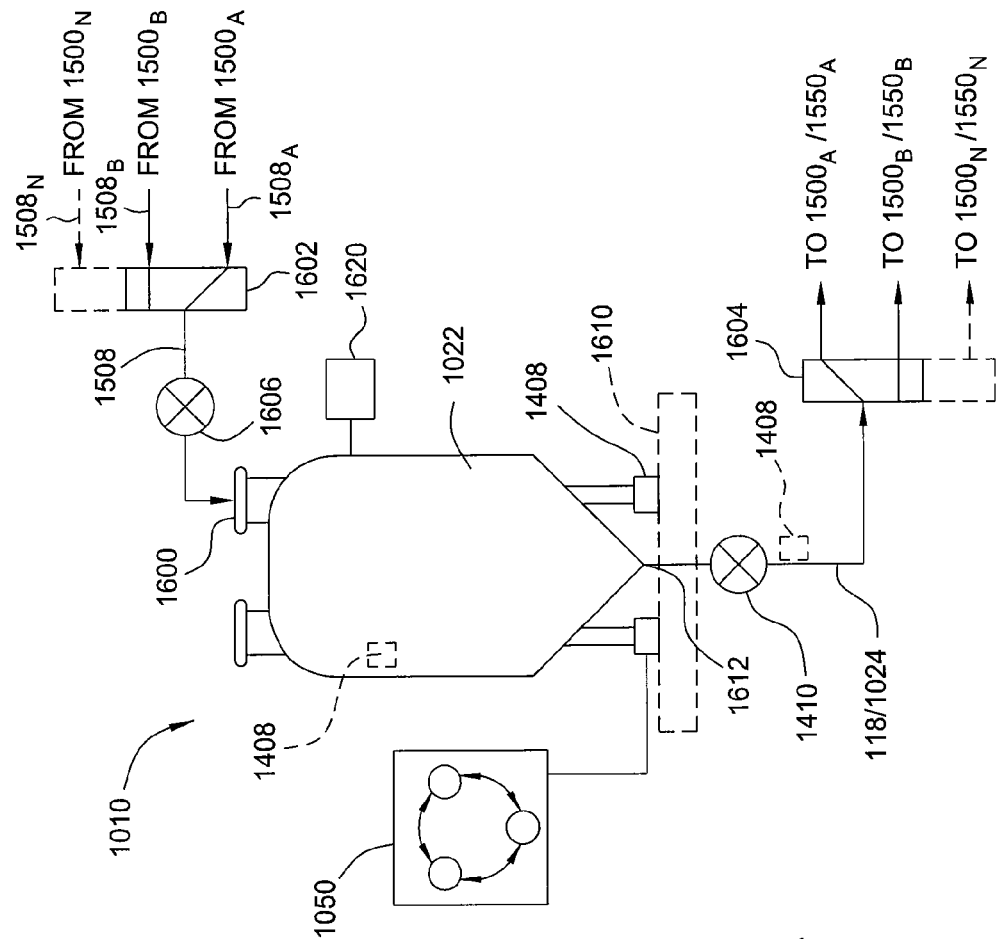
FIGS. 18A-18B are schematic diagrams for coupling an addition system to one or more units in accordance with exemplary alternative embodiments of the invention.
Figure 18B:
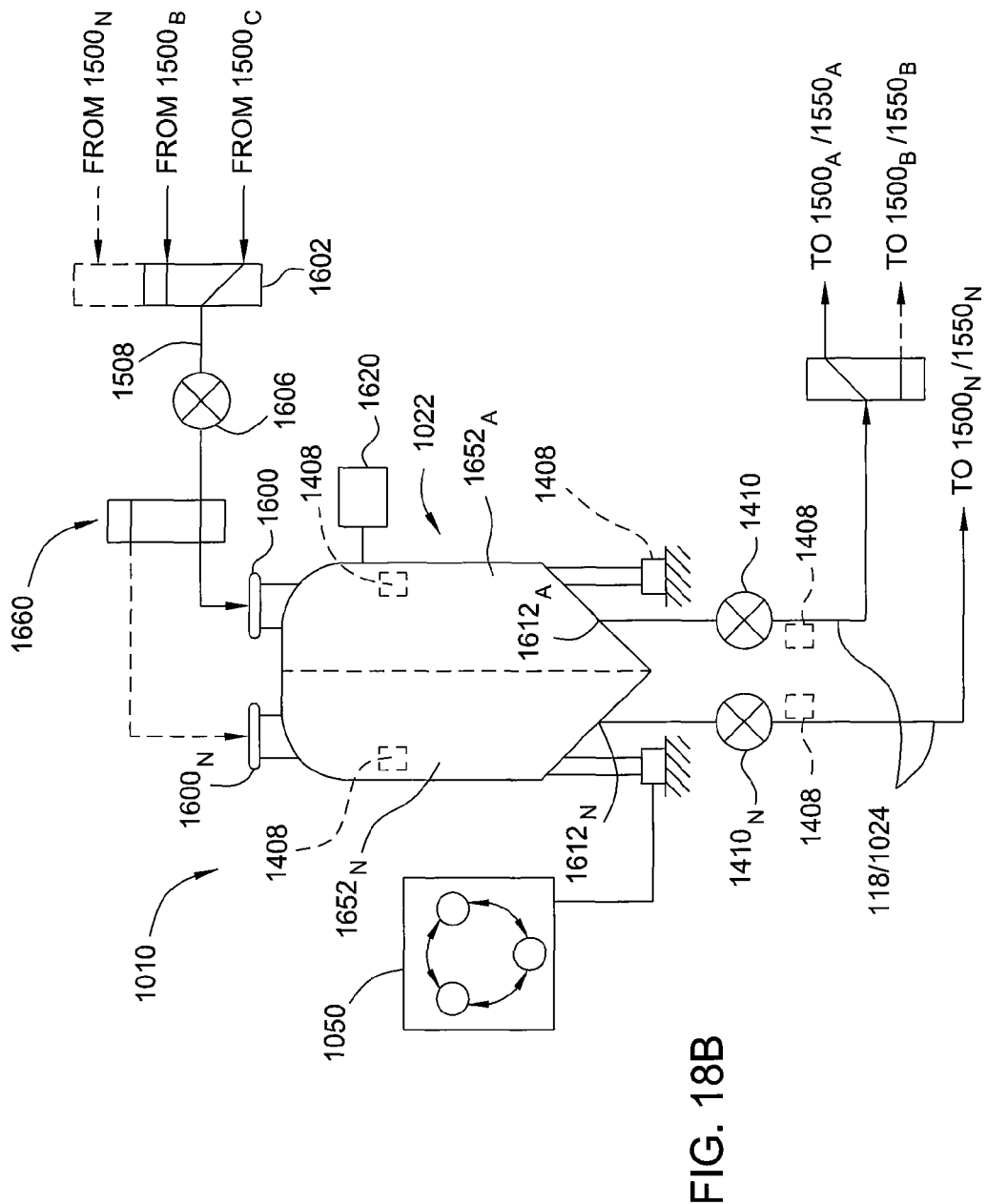

FIGS. 18A-18B are schematic diagrams of one embodiment for coupling an addition system to one or more units as described in FIGS. 17A-C. In the embodiment depicted in FIG. 18A, a down stream addition system 1010 is provided which has a selector valve (or valves) 1604 coupled to an outlet port 1612 of the vessel 1022. The controller 1050 may operably change the state of the valve 1604 such that material (i.e., virgin DSA 600, recycled DSA 600, virgin CEM 300, and recycled CEM 300) may be directed to a reaction zone of a selected one or more of the units $1500_A$, $1500_B$, and $1500_N$ and/or to a reaction zone of a selected one or more of the exhaust paths $1550_A$, $1550_B$, and $1550_N$ of the units $1500_A$, $1500_B$, and $1500_N$. Similarly, the down stream addition system 1010 has a selector valve (or valves) 1602 coupled to an inlet port 1600 of the vessel 1022. The controller 1050 may operably change the state of the valve 1602 such that material (i.e., recycled DSA 600 and recycled CEM 300) recovered by a particle removal device 1502 may be directed to a reaction zone of a selected one or more of the unit $1500_A$, $1500_B$, and $1500_N$ and/or to a reaction zone of a selected one or more of the exhaust paths $1550_A$, $1550_B$, and $1550_N$ of the units $1500_A$, $1500_B$, and $1500_N$.

Additionally shown in FIG. 18A is an optional transportable platform 1610 (shown in phantom) which may be utilized with any of the addition systems described herein. The transportable platform 1610 may be a pallet, container, flat bed trailer, rail car, barge, or other readily transportable platform which can support a down stream addition system during both transport and use. The transportable platform 1610 may also support at least one or more of the controller 1050, a pressure regulating device 1620, and power generator (not shown).

In the embodiment depicted in FIG. 18B, a down stream addition system 1010 is provided which has a plurality of compartments (shown as compartments $1652_A$, $1652_N$) in a common vessel 1022. N is representative of one or more of the items identified by the reference numeral. Each compartment $1652_A$, $1652_N$ may be loaded through a separate inlet port $1600_A$, $1600_N$ and may be emptied through respective dedicated outlet ports $1612_A$, $1612_N$. Selector valves 1604 are coupled to outlet ports $1612_A$, $1612_N$ of the vessel 1022 to direct the material exiting the vessel 1022 to a reaction zone of a selected one or more of the units $1500_A$, $1500_B$, and $1500_N$ and/or to a reaction zone of a selected one or more of the exhaust paths $1550_A$, $1550_B$, and $1550_N$ of the units $1500_A$, $1500_B$, and $1500_N$. Similarly, the selector valves 1602, 1660 coupled to the inlet ports $1600_A$, $1600_N$ of the vessel 1022 direct material (i.e., recycled DSA 600, recycled CEM 300) recovered by a particle removal device 1502 into a selected compartment $1652_A$, $1652_N$ for later delivery to a reaction zone of a selected one or more of the unit $1500_A$, $1500_B$, and $1500_N$ and/or to a reaction zone of a selected one or more of the exhaust paths $1550_A$, $1550_B$, and $1550_N$ of the units $1500_A$, $1500_B$, and $1500_N$.

Embodiments of the invention additionally contemplate methods that may be performed using at least one of CEM 300 and DSA 600. Embodiments of the methods may also be practiced utilizing the additional systems described above with reference to FIGS. 9-18B, or other suitable addition system, to enhance collection of PM and/or reduce emissions of a unit.

Figure 19:
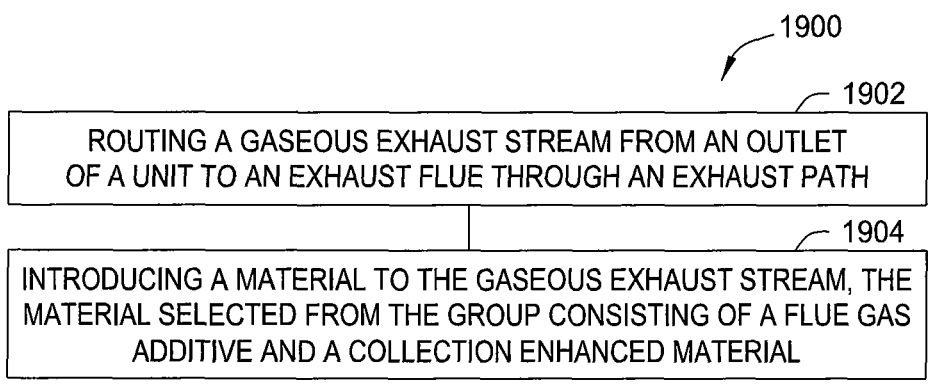
FIG. 19 is a flow diagram of a method of providing at least one of a collection enhanced material and flue gas additive to a gaseous exhaust stream of a unit in accordance with embodiments of the invention.

FIG. 19 is a flow diagram of one embodiment of a method 1700 that may be practiced in accordance with the present invention. The method 1700 generally provides at least one of CEM 300 and DSA 600 to a gaseous exhaust stream of a unit, such as the units described above. The method 1700 begins at step 1702 by routing a gaseous exhaust stream from an outlet of a unit to an exhaust flue through an exhaust path. At step 1704, material such as DSA 600 or CEM 300 is introduced to the gaseous exhaust stream. In an embodiment, the material is selected to enhance collection of PM from the gaseous exhaust stream. In another embodiment, the material is selected to reduce emissions of the unit. In yet another embodiment, the material is selected to both to enhance collection of PM from the gaseous exhaust stream while reducing emissions of the unit. In one embodiment, CEM 300 is introduced to the gaseous exhaust stream after passing through the unit. In another embodiment, CEM 300 is introduced to the gaseous exhaust stream without passing through the unit. In one embodiment, DSA 600 is introduced to the gaseous exhaust stream without passing through the unit.

Figure 20:
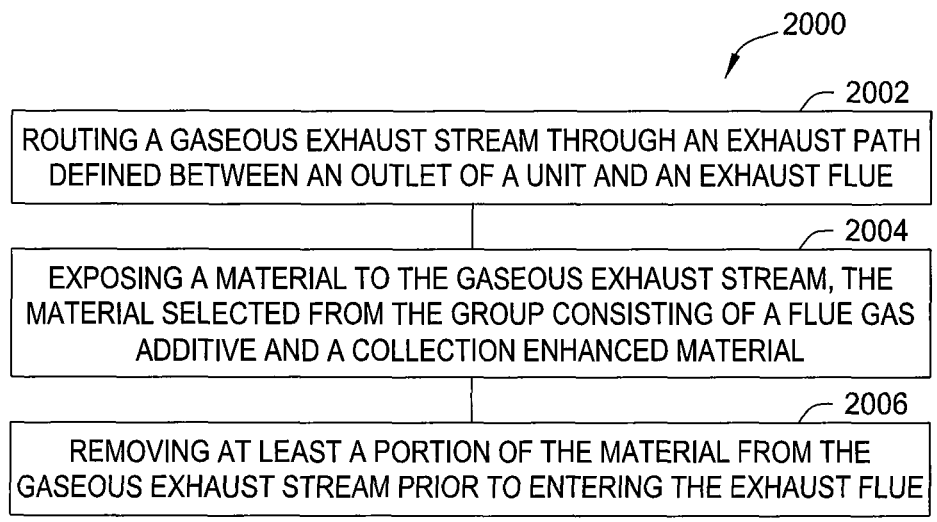
FIG. 20 is a flow diagram of a method of removing at least one of a collection enhanced material and flue gas additive to a gaseous exhaust stream of a unit in accordance with embodiments of the invention.

FIG. 20 is a flow diagram of another embodiment of a method 1800 that may be practiced in accordance with the present invention. The method 1800 generally removes at least one of CEM 300 and DSA 600 from a gaseous exhaust stream of a unit, such as the units described above. The method 1800 begins at step 1802 by routing a gaseous exhaust stream through an exhaust path defined between an outlet of a unit and an exhaust flue. At step 1804, a material such as DSA 600 or CEM 300 is exposed to the gaseous exhaust stream. At step 1806, at least a portion of the material entrained in the gaseous exhaust stream is removed prior to entering the exhaust flue. In one embodiment, the material is exposed to the gaseous exhaust stream after passing through the unit. In another embodiment, the material is exposed to the gaseous exhaust stream without passing through the unit.

Figure 21:
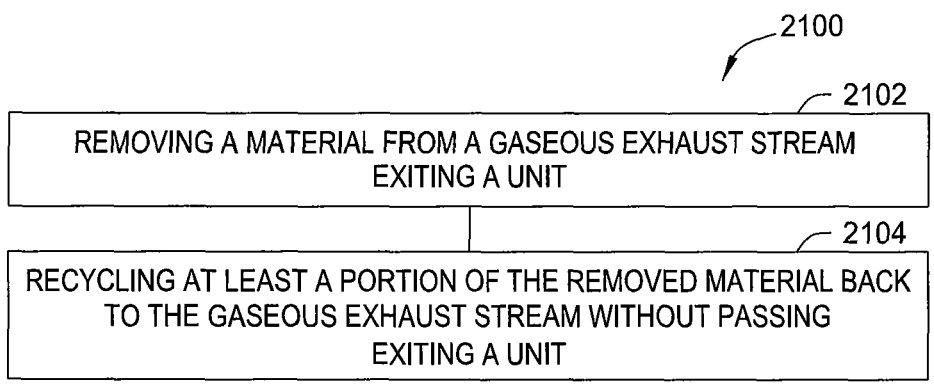
FIG. 21 is a flow diagram of a method of recycling at least a portion of material removed from a gaseous exhaust stream of a unit back to the gaseous exhaust stream without passing through the unit in accordance with embodiments of the invention.

FIG. 21 is a flow diagram of another embodiment of a method 1900 that may be practiced in accordance with the present invention. The method 1900 generally recycles material removed a gaseous exhaust stream of a unit, such as the units described above. The method 1900 begins at step 1902 by removing a material from a gaseous exhaust stream exiting a unit. The method 1900 continues at step 1904 by recycling at least a portion of the removed material back to the gaseous exhaust stream without passing through the unit. The material recycled to the gaseous exhaust stream without the recycled material passing through the unit may be at least one of at least one of CEM 300 and DSA 600. In an embodiment, the material is selected to enhance collection of PM from the gaseous exhaust stream. In another embodiment, the material is selected to reduce emissions of the unit. In yet another embodiment, the material is selected to both to enhance collection of PM from the gaseous exhaust stream while reducing emissions of the unit. In still another embodiment, at least a portion of the recycled material is passed through the unit prior to reentering the exhaust gas stream.

Thus, one or more collection enhanced materials, down stream additives, methods of making the same, apparatuses for handling the same when used with one or more units, and methods for using the same to improve the operation of units, such as fluidized units, among others, has been provided. The materials of the present invention advantageously reduce emission of pollutants. Additionally, equipment, method and systems have been described which allow for the efficient handling of said materials with various units, thereby enabling refiners and other unit operators to cost effectively control processes.

What is claimed is:

1. A method comprising:
routing a gaseous exhaust stream from an outlet of a fluid catalytic cracking (FCC) unit to an exhaust flue through an exhaust path; and
introducing a downstream additive material to the gaseous exhaust stream, wherein the downstream additive material comprises (a) an active phase component, and (b) a collection enhancing component having a characteristic selected from the group consisting of increased magnetic susceptibility encouragement of clumping, and low electrical resistivity; and the active phase component comprises a $SO_x$ emission reducing component and/or a $NO_x$ emission reducing component.

2. The method of claim 1 further comprising:
introducing a conditioning agent to the gaseous exhaust stream prior the exhaust flue.

3. The method of claim 1, wherein the
$SO_x$ emission reducing component comprises a spinel, a magnesium aluminum oxide crystallizing with a periclase structure, a precursor to a hydrotalcite or a hydrotalcite-like material HTL, a hydrotalcite, an HTL, a dehydrated or dehydroxylated hydrotalcite, a dehydrated or dehydroxylated HTL, and combinations thereof.

4. A method comprising:
routing a gaseous exhaust stream through an exhaust path defined between an outlet of a FCC unit and an exhaust flue;
exposing a downstream additive material to the gaseous exhaust stream, wherein the downstream additive material comprises (a) an active phase component, and (b) a collection enhancing component having a characteristic selected from the group consisting of increased magnetic susceptibility, encouragement of clumping, and low electrical resistivity; and the active phase component comprises a $SO_x$ emission reducing component and/or a $NO_x$ emission reducing component; and
removing at least a portion of the downstream additive material from the gaseous exhaust stream prior to entering the exhaust flue.

5. The method of claim 4, wherein exposing comprises:
adding the downstream additive material into the exhaust path downstream of the FCC unit.

6. The method of claim 4, wherein exposing comprises:
passing the downstream additive material through the FCC unit into the exhaust path.

7. A method comprising:
removing a downstream additive material from a gaseous exhaust stream exiting a FCC unit; and
recycling at least a portion of the removed downstream additive material back to the gaseous exhaust stream without passing through the FCC unit,
wherein the downstream additive material comprises (a) an active phase component, and (b) a collection enhancing component having a characteristic selected from the group consisting of increased magnetic susceptibility, encouragement of clumping, and low electrical resistivity; and the active phase component comprises a $SO_x$ emission reducing component and/or a $NO_x$ emission reducing component.

8. The method of claim 7 further comprising:
adding the downstream additive material into the exhaust path downstream of the FCC unit.

9. The method of claim 7 further comprising:
passing the downstream additive material through the FCC unit into the gaseous exhaust stream.

10. The method of claim 7 further comprising:
exposing the gaseous exhaust stream through a bed comprised of downstream additive material.

11. The method of claim 7 further comprising:
recycling a portion of the removed downstream additive material to the FCC unit.

* * * * *